US010097552B2

(12) United States Patent
Wadley et al.

(10) Patent No.: US 10,097,552 B2
(45) Date of Patent: Oct. 9, 2018

(54) NETWORK OF TRUSTED USERS

(71) Applicant: Bank of America Corporation, Charlotte, NC (US)

(72) Inventors: Cameron Wadley, Waxhaw, NC (US); Jiyoung Choi, Chicago, IL (US); Hamid Dalglijli, Chicago, IL (US); Thomas H. Judge, Chicago, IL (US); Britton T. Farrell, Chicago, IL (US); Katherine Dintenfass, Lincoln, RI (US); Craig Terrill, Barrington Hills, IL (US); Susan Varghese, Atlanta, GA (US); Minh Vuong, Clovis, CA (US)

(73) Assignee: Bank of America Corporation, Charlotte, NC (US)

( * ) Notice: Subject to any disclaimer, the term of this patent is extended or adjusted under 35 U.S.C. 154(b) by 201 days.

(21) Appl. No.: 15/164,519

(22) Filed: May 25, 2016

(65) Prior Publication Data
US 2017/0346823 A1 Nov. 30, 2017

(51) Int. Cl.
*H04L 29/06* (2006.01)
*G06F 21/50* (2013.01)
(Continued)

(52) U.S. Cl.
CPC .............. *H04L 63/10* (2013.01); *G06Q 50/01* (2013.01); *H04L 51/32* (2013.01);
(Continued)

(58) Field of Classification Search
CPC ........ H04L 51/32; H04L 63/102; G06F 21/50
(Continued)

(56) References Cited

U.S. PATENT DOCUMENTS 5,867,799 A 2/1999 Lang et al.
7,069,259 B2 6/2006 Horvitz et al.
(Continued)

OTHER PUBLICATIONS

Flanders, David et al., "The Advantage of APIs," Jisc, archived Dec. 2014, 17 pages; retrieved from https://www.isc.ac.uk/guides/the-advantage-of-apis.
(Continued)

*Primary Examiner* — Izunna Okeke
(74) *Attorney, Agent, or Firm* — Banner & Witcoff, Ltd.; Michael A. Springs

(57) ABSTRACT

A system may include at least one server having a processor and a communication interface communicatively coupled to an Internet connection and a non-transitory memory device storing instructions that cause the system to retrieve, from a data repository, user information corresponding to a user of products and/or services of a business entity, identify by, at least one a social network identification of the user, and match the user to a plurality of individuals based on the user information. The system may the plurality of social network communications associated with the social network identification of the user using rules provided by the rules engine server, and generate, by the sourcing engine server, based on the analyzed social network communications, a trigger condition based on predetermined criteria stored in a database and in response to the trigger condition, solicit, via a secure network, input from the matched individuals corresponding to the trigger condition.

19 Claims, 8 Drawing Sheets

(51) Int. Cl.
  *G06Q 50/00* (2012.01)
  *H04L 12/58* (2006.01)
  *H04W 12/08* (2009.01)
  *H04W 12/12* (2009.01)
  *H04W 4/21* (2018.01)

(52) U.S. Cl.
  CPC .......... *H04L 63/1408* (2013.01); *H04W 4/21* (2018.02); *H04W 12/08* (2013.01); *H04W 12/12* (2013.01)

(58) Field of Classification Search
  USPC .................................................. 726/1, 2, 26
  See application file for complete search history.

(56) References Cited

U.S. PATENT DOCUMENTS

| | | | |
|---|---|---|---|
| 7,395,316 B2 | 7/2008 | Ostertag et al. | |
| 7,694,135 B2 | 4/2010 | Rowan et al. | |
| 7,698,190 B2 | 4/2010 | Penkalski et al. | |
| 8,112,332 B1 | 2/2012 | Garcia | |
| 8,214,899 B2 | 7/2012 | Chien | |
| 8,234,194 B2 | 7/2012 | Mele et al. | |
| 8,240,557 B2 | 8/2012 | Fernandes et al. | |
| 8,352,881 B2 | 1/2013 | Champion et al. | |
| 8,417,608 B2 | 4/2013 | Benefield et al. | |
| 8,425,605 B2 | 4/2013 | Zielinski | |
| 8,537,986 B1 | 9/2013 | Cantu, II | |
| 8,596,528 B2 | 12/2013 | Fernandes et al. | |
| 8,606,678 B2 | 12/2013 | Jackowitz et al. | |
| 8,666,836 B2 | 3/2014 | Adams | |
| 8,676,937 B2 | 3/2014 | Rapaport et al. | |
| 8,725,605 B1 | 5/2014 | Plunkett | |
| 8,862,512 B2 | 10/2014 | Joa et al. | |
| 8,881,257 B2 | 11/2014 | Cha et al. | |
| 9,049,259 B2 | 6/2015 | Rathod | |
| 9,053,471 B2 | 6/2015 | Mages et al. | |
| 9,081,580 B2 | 7/2015 | Gaffney et al. | |
| 9,336,269 B1 | 5/2016 | Smith et al. | |
| 9,396,236 B1 | 7/2016 | Vanderwater et al. | |
| 9,477,969 B2 | 10/2016 | Boerries et al. | |
| 2008/0222283 A1 | 9/2008 | Ertugrul et al. | |
| 2010/0161379 A1 | 6/2010 | Bene et al. | |
| 2010/0161467 A1 | 6/2010 | Ageenko et al. | |
| 2011/0016534 A1 | 1/2011 | Jakobsson et al. | |
| 2011/0137776 A1 | 6/2011 | Goad et al. | |
| 2011/0153646 A1 | 6/2011 | Hong et al. | |
| 2013/0073473 A1 | 3/2013 | Heath | |
| 2013/0151639 A1* | 6/2013 | Vastardis ........... G06Q 30/0241 709/206 |
| 2013/0159115 A1 | 6/2013 | Adams | |
| 2013/0226813 A1 | 8/2013 | Voltz | |
| 2013/0290198 A1 | 10/2013 | Vassil | |
| 2013/0340086 A1 | 12/2013 | Blom | |
| 2014/0136619 A1 | 5/2014 | Hoberman | |
| 2014/0245207 A1 | 8/2014 | Poulin | |
| 2014/0297394 A1 | 10/2014 | Li et al. | |
| 2014/0310142 A1 | 10/2014 | Mak | |
| 2014/0344718 A1 | 11/2014 | Rapaport et al. | |
| 2014/0379272 A1 | 12/2014 | Sathe | |
| 2015/0046325 A1 | 2/2015 | McCracken et al. | |
| 2015/0142595 A1 | 5/2015 | Acuna-Rohter | |
| 2015/0235179 A1 | 8/2015 | Schmidt et al. | |
| 2016/0035039 A1 | 2/2016 | Singh et al. | |
| 2017/0180293 A1 | 6/2017 | Eberbach | |
| 2017/0278053 A1 | 9/2017 | High et al. | |
| 2018/0025010 A1 | 1/2018 | Ramer et al. | |

OTHER PUBLICATIONS

Sia, Ka Cheung, "Challenges and opportunities in building personalized online content aggregators", University of California, Los Angeles, ProQuest Dissertations Publishing, 2009. 3364026; extracted from Dialog Search website on Aug. 13, 2018.

* cited by examiner

NETWORK OF TRUSTED USERS

CROSS-REFERENCE TO RELATED APPLICATIONS

This application is related to U.S. patent application Ser. No. 15/164,448 filed on May 25, 2016, and entitled "System for Utilizing One or More Data Sources to Generate a Customized Set of Operations," U.S. patent application Ser. No. 15/164,472 filed on May 25, 2016, and entitled "System for Utilizing One or More Data Sources to Generate a Customized Interface," U.S. patent application Ser. No. 15/164,501 filed on May 25, 2016, and entitled "System for Providing Contextualized Search Results of Help Topics ," and U.S. patent application Ser. No. 15/164,526 filed on May 25, 2016, and entitled "Contextualized User Recapture System," which are hereby incorporated by reference herein in its entirety.

BACKGROUND

Organizations, such as corporate entities, educational institutions, government agencies, and/or other large enterprise organizations, may provide various services to users. In providing these services, these organizations may maintain one or more data repositories of information relating to the various services, and/or users of the various services, that may be offered by the organizations. In some cases, a user of the services provided by the organization may desire input from one or more trusted users of the network. However, using current mechanisms, the reliability of the input received from the users may not be known. As such, a need has been recognized to provide a secure network in which a trusted group of individuals may be notified of a request for input by a particular user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects described herein provide a system may include at least one server having a processor and a communication interface communicatively coupled to an Internet connection and a non-transitory memory device storing instructions that cause the system to retrieve, from a data repository, user information corresponding to a user of products and/or services of a business entity, identify by, at least one a social network identification of the user, and match the user to a plurality of individuals based on the user information. The system may the plurality of social network communications associated with the social network identification of the user using rules provided by the rules engine server and generate, by the sourcing engine server, based on the analyzed social network communications, a trigger condition based on predetermined criteria stored in a database and in response to the trigger condition, solicit, via a secure network, input from the matched individuals corresponding to the trigger condition.

The details of these and other aspects of the disclosure are set forth in the accompanying drawings and description below. Other features and advantages of the disclosure will be apparent from the drawings and description.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
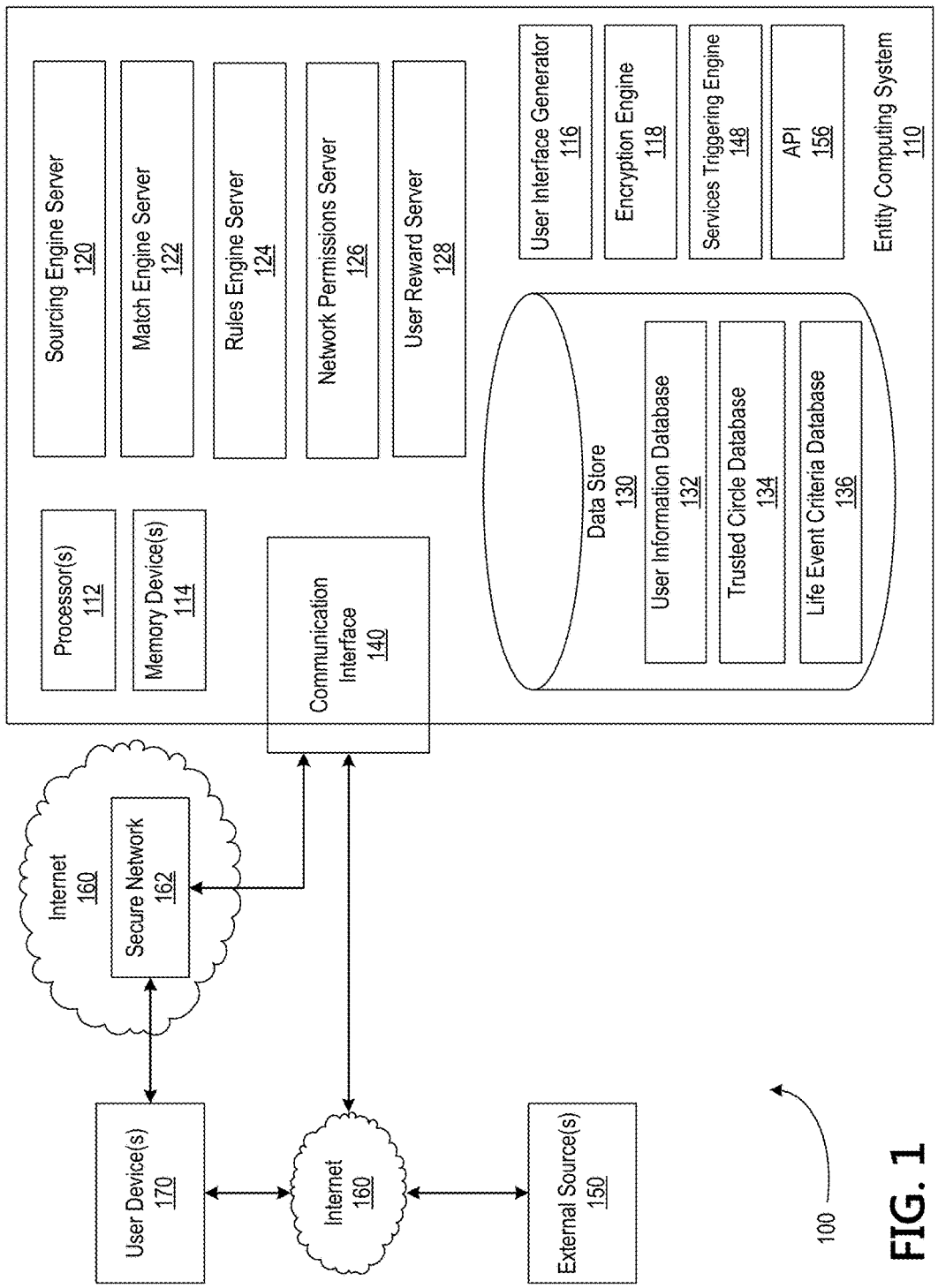
FIG. 1 shows an illustrative computing environment including a organization computing system configured to provide a secure communication network for a trusted group of users in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, entities, such as corporations, governments, universities, and the like, may maintain data repositories associated with users of the various services provided by the entities. Further, in some cases, the entities may provide one or more products and/or services of use by a user (e.g., a customer) in response to a life event experienced by that particular user. However, the user may not know which ones of the products or services provided by the entity may be of most use. As such, the user may wish to receive advice from one or more individuals known and trusted by the user. In many cases, the advice sought by the user may require communication of sensitive information which the entity and/or the user may wish to remain secure. Given the sensitive nature of the information that may be communicated between the user and other individuals, the user may choose to forgo asking for advice and may lose out on one or more opportunities that may be available from use the organization's products and/or services. Accordingly, the devices, systems, and methods described herein may relate to systems and methods of providing a secure communication network for use in exchanging encrypted messages between a user and a trusted circle of individuals in response to a life event trigger experienced by the user. In some cases, the life event trigger may be identified using historical and real-time data gathered from internal and external sources.

Aspects of the present disclosure are directed at a secure communication system provided by the entity, where user interaction via the secure communication system is facilitated by an analysis of communications relating to a user of one or more social media platforms (e.g., social networks), an identification of trusted individuals known and trusted by the user who may or may not also be users of products and/or services provided by the entity, an identification of life event triggers that may be experienced by the user, and to solicit and/or communicate advice regarding the particular life event behind the triggering event. In some cases, a sourcing engine server may be used to identify information associated with the user, such as social media accounts, user information stored in a user information database, and the like. This information may be used by a matching engine server to match a user with one or more individuals known and/or trusted by the user to provide advice in response to at least one triggering life event (e.g., a home purchase, a marital status change, a parental status change, and the like). A secure network may be provided by the entity to facilitate secure (e.g., encrypted) communications between the user and the identified trusted circle of individuals over which the user may choose to communicate sensitive information (e.g., financial information, account information, social security numbers, and the like) in relation to the triggering event and/or the products and services offered by the entity. A ratings server and/or rewards server may be used to manage a level of quality associated with advice communicated by the trusted circle of individuals, and questions asked by the user, through the use of ratings and/or rewards that may be provided in relation to a perceived quality. In some cases, one or more triggering life events may be identified in view of the analysis of the real-time and/or historical user behavior/preferences in relation to recent or upcoming activities of the user.

Additionally or alternatively, the user interaction contextualization system of an organization may receive notification of a user accessing one of the organization's services via a user device. As discussed above, the user interaction contextualization system may collect data from various internal and external data sources, and/or web page tracking mechanisms. The data gathered from these various sources may be analyzed to determine the user's likelihood of abandoning the organization's services. Where there is a likelihood of abandonment, the user interaction contextualization system may initiate one or more user recapture solution.

FIG. 1 shows an illustrative computing environment including a networked computing system 100 configured to provide a secure communication network for a trusted circle of users. The networked computing system 100 may include one or more computing devices that may include one or more processors 112 and/or memory devices 114. In an illustrative example, the networked computing system 100 may include an entity computing system 110, which may be configured to communicate with one or more user devices 170 and/or one or more external sources 150 (e.g., external computing networks) via a communication network (e.g., the Internet 160). The entity computing system 110 may include one or more servers configured to provide computing functions to facilitate a user experience with products and/or services offered by the entity and/or communication functionality in relation to the products and services. For example, the entity computing system 110 may include a sourcing engine server 120, a match engine server 122, a rules engine server 124, a network permissions server 126, a user reward server 128, a services triggering engine 148, and/or the like. In some cases, one or more servers of the entity computing system 110 may include a user interface generator 116 (e.g. a user interface generation device), an encryption engine to facilitate user communication via a secure network 162 provided by and/or maintained by the various devices of the entity computing system 110. In many cases, one or more devices of the communication interface 140 (e.g., modems, routers, switches, and the like) may be included in the entity computing system 110 as stand-alone devices or included as services incorporated into devices providing other services. The entity computing system 110 may analyze the user-related data stored in the data store 130 using rules stored in or processed by the rules engine server 124. For example, the entity computing system 110 may utilize rules engine server 124 to determine whether data stored the data store 130 corresponds to a trusted data value and/or whether one or more data elements stored in the data store 130 are indicative of a predefined event. If a predefined event is detected, the services triggering engine 148 may send a set of operations to be completed to a user or generate instructions to be executed by one or more different servers. In some cases, predefined events detected by the entity computing system 110 may further be accessed by a multi-platform API 156.

A system may include at least one server having a processor and a communication interface communicatively coupled to an Internet connection and a non-transitory memory device storing instructions that cause the system to retrieve, from a data repository, user information corresponding to a user of products and/or services of a business entity, identify by, at least one a social network identification of the user, and match the user to a plurality of individuals based on the user information. The system may the plurality of social network communications associated with the social network identification of the user using rules provided by the rules engine server 124, and generate, by the sourcing engine server, based on the analyzed social network communications, a trigger condition based on predetermined criteria stored in a database and in response to the trigger condition, solicit, via a secure network, input from the matched individuals corresponding to the trigger condition.

The user devices 170 may be any type of computing device configured to provide the functionality described herein. For instance, the user devices 170 may include a desktop computer, server computer, laptop computer, tablet computer, smartphone, wearable device, automated teller machine (ATM), or the like. In some cases, the user devices 170 may be configured to receive and/or display a user interface, receive input via the user interface, and communicate the received input to one or more other computing devices via a communication network (e.g., the Internet 160, a telecommunications network, a local area network (LAN), a wide area network (WAN), the secure network 162, and the like). As such, the user devices 170 may provide a user interface (e.g., a web browser, a desktop application, a mobile application, or the like) that enables the user to communicate via the Internet 160 to one or more external sources 150, receive notification of individuals for inclusion in a trusted circle, and/or communicate to one or more individuals of the trusted circle in response to a life event trigger via the secure network 162. The user devices 170 may, in some instances, be a special-purpose computing device configured to perform specific functions.

The entity computing system 110 may acquire information related to social media posts corresponding to the user, the user device 170 associated with the user and/or access notification, or the user associated with a customer of the entity's services and/or products. In some cases, the entity computing system may acquire an access notification from one or more internal systems, such as systems associated with and/or operated by the organization, corresponding to a product or service provided by the entity. In some examples, the internal systems may include organization servers. The organization servers may be any type of computing device configured to provide the functionality described herein. For instance, an organization server may be a database server, a file server, a web server, an application server, or the like. In some examples, the organization server may include one or more of the sourcing engine server 120, the match engine server 122, the rules engine server 123, the network permissions server 126, the user reward server 128, a server providing the data store 130 (e.g., the user information database 132, the trusted circle database 134, the life event criteria database, a rules database, the and/or the like and may be configured to communicate with the one or more other devices internal or external to the entity computing system 110 relating to information stored on the organization server. The organization server may store, for example, information relating to one or more services offered by the organization, one or more applications by the organization, and/or one or more users associated with the organization.

Further, the entity computing system 110, such as by the sourcing engine server 120, may acquire information related to the user, the user devices 170 associated with the user and/or access notification, and/or the user associated with the search request and/or access notification from one or more external sources 150. For example, the entity computing system 110 may acquire information from various social media channels (e.g., social media networks, social media sites, social media messaging systems, and the like), fitness trackers, Internet of Things (IoT) devices, and so forth. Additionally or alternatively, the entity computing system 110 may retrieve results generated by various search systems. In some cases, the sourcing engine server 120 may retrieve information corresponding to the user and/or one or more members of the user's trusted circle via the Internet 160 from the various social media channels and/or devices discussed above.

The networked computing system 100 may also include one or more networks, which may interconnect one or more of the entity computing system 110, the user devices 170, the secure network 162, one or more organization servers, and/or external sources 150. Thus, the entity computing system 110 may be in signal communication with the user devices 170, one or more other organization servers, and the external sources 150 via a network. The networks may include one or more of a wired network (e.g., the Internet 160, LAN, WAN, or the like), a wireless network (e.g., a cellular network, Bluetooth, NFC, or the like), or a combination of wired or wireless networks.

In some examples, the networked computing system 100 may include an organization network. The organization network may include one or more sub-networks (e.g., LANs, WANS, or the like). The organization network may be associated with a particular organization (e.g., a corporation, enterprise organization, educational institution, governmental institution, and the like) and may interconnect one or more computing devices associated with the organization. For example, the entity computing system 110 and organization servers (e.g., the sourcing engine server 120, the match engine server 122, the rules engine server 124, the network permissions server 126, the user reward server 128, and the like) may be associated with an organization (e.g., an enterprise organization), and an organization network may be associated with and/or operated by the organization, and may include one or more networks (e.g., the Internet, LANs, WANs, VPNs, or the like) that interconnect the entity computing system 110, organization servers, and one or more other computing devices and/or computer systems that are used by, operated by, and/or otherwise associated with the organization. In some cases, the networked computing system 100 may include a secure network 162 operated by the organization to provide a secure communication link for one or more users (e.g., the user, the trusted circle of users, customers, and the like) to safely and securely communicate from the one or more user devices 170 to one or more devices included in the entity computing system 110, such as by enabling user permissions, network permissions and/or passwords, one or more encryption method for the messages and communication packets communicated via the secure network 162. In some cases, the secure network 162 may be a stand-alone network operated by the entity. In some cases, the secure network may be a secure network capable of being logged into by a plurality of users via a different network connection. For example, a user may communicate from the user devices 170 to the entity computing system via a first network connection (e.g., the Internet 160, a cellular network, or other publically accessible network) and may log into a second network connection (e.g., the secure network 162 or other such private network connection such as a virtual private network and the like.).

FIG. 1 shows an example implementation of an entity computing system 110 that may be used to generate, manage, or provide a secure network over which a user may solicit information and/or advice from a trusted circle of users in relation to one or more life events based on an identified life event trigger. The life event triggers may be identified by one or more components of the entity computing system 110 via information observed on a plurality of social media networks (e.g., the external sources 150 and the like) and/or one or more internal systems and/or databases (e.g., the data store 130 and the like). The entity computing system 110 may include various components, modules, and sub-modules that facilitate various tasks, including identifying one or more users of an entity's products and/or services, identifying one or more individuals that also use the entity's products and services, and/or external individuals known and trusted by the user, sourcing information from one or more internal data stores, sourcing information from one or more external sources 150 (e.g., social media networks, and the like), analyzing the information based on rules defined by the entity, identifying one or more life event triggers (e.g., a birth, a death, a graduation, a birthday, a marriage, a divorce, and the like), soliciting information corresponding to the life event in response to the life event trigger from one or more individual members of the trusted circle associated with the user, assigning permissions to each member of the trusted circle associated with the user, associating a rating to one or more of the user and each member of the trusted circle who provided advice and/or granting rewards based on at least an amount of advice given and/or associated ratings. It will be appreciated that the entity computing system 110 illustrated in FIG. 1 is shown by way of example and that other implementations of an entity computing system 110 may include additional or alternative components, modules, sub-modules, and the like. In this example, the entity computing system 110 includes one or more processors 112, one or more memory devices 114, a communication interface 140, a user interface generator 116, an encryption engine 118, the sourcing engine server 120, the match engine server 122, the rules engine server 124, the network permissions server 126, the user reward server 128, the data store 130, the user information database 132, the trusted circle database 134, the life event criteria database 136 and the like. Thus, the entity computing system 110 may be implemented using a special-purpose computing device (or computing devices) that have been specially programmed to perform functionality according to one or more aspects of the present disclosure.

The one or more processors 112 (e.g., a microprocessor, a microcontroller, and the like) of the entity computing system 110 may operate by using one or more algorithms that facilitates identifying individuals for inclusion in the trusted circle of a user, analyzing a plurality of information obtained from a plurality of internal sources (e.g., the data store 130, and the like) and/or external sources 150, identifying a life event trigger associated with the user, configuring the trusted circle of users corresponding to the user including setting permissions and/or access to different information associated with the user and/or the entity, soliciting advice based on the permissions and the life event trigger, assigning a rating to each user of the trusted circle and/or providing rewards based on the ratings and/or participation in the trusted circle. These algorithms may be included as instructions or rules stored in the one or more memory devices 114, the data store 130, and/or may be included as a portion of the sourcing engine server 120, the match engine server 122, the rules engine server 124, the network permissions server 126, the user reward server 128 and the like. Additionally, the one or more processors 112 may operate by receiving information from the one or more external sources 150. An illustrative algorithm will be described below with reference to FIG. 2.

In this example, the one or more processors 112 may be configured to operate the algorithm, the user interface generator 116, the encryption engine 118, provide or manage the secure network 162, and/or at least a portion of the sourcing engine server 120, the match engine server 122, the rules engine server 124, the network permission server 126, the user reward server 128 and/or the data store 130, the user information database 132, the trusted circle database 134 or the life event criteria database 136 using an operating system (e.g., a proprietary operating system, an open source operating system, an embedded operating system, and/or the like). In some cases, the one or more memory devices 114 may be communicatively coupled to the one or more processors 112, such as via a data bus. The one or more memory devices 114 may be used to store any desired information, such as the aforementioned algorithms, a lookup table, computer-executable instructions to implement the sourcing of a trusted circle of individuals, identification of a life event trigger, providing ratings and/or permissions, and/or the like.

The one or more memory devices 114 may be any suitable storage, including, but not limited to RAM, ROM, EPROM, flash memory, a hard drive, and so forth. In some examples, the one or more processors 112 may store information within and/or may retrieve information from the one or more memory devices 114.

The communication interface 140 of the entity computing system 110 may facilitate communication between one or more components of the entity computing system 110, the external sources 150, the user devices 170, and/or the organization servers via a network using one or more wired or wireless communication links. The communication interface 140 may facilitate communication between one or more networks internal to the entity computing system 110 or external to the entity computing system 110. In some cases, the communication interface 140 may be configured to communicate via an open network (e.g., the Internet 160) or a secured network (e.g., the secure network 162, a VPN), or a combination of public and private networks. In some examples, the entity computing system 110 may include one or more computing devices that may be communicatively coupled to a network. The network may be communicatively coupled to one or more devices, such as to servers associated with the external sources 150, the user devices 170, and/or the organization servers. The network may include one or more wired and/or wireless networks, such as a telecommunications network (e.g., a cellular network, a land line network, a cable network, and the like), a Wi-Fi network, a LAN, a WAN, the Internet 160, and the like. When used in a LAN networking environment, the entity computing system 110 may include a modem and/or other means for establishing wired and/or wireless communication over the WAN, such as the Internet 160. It will be appreciated that the network connections discussed herein are illustrative and other means of establishing communication links between one or more networks included as part of the entity computing system 110, the external sources 150, the user devices 170, and/or the organization servers 164 may include one or more various protocols such as TCP/IP, Ethernet, FTP, HTTP, and so forth.

The data store 130 of the entity computing system 110 may be used to store information related to a plurality of users (e.g., previous and current users of the organization's products and/or services). For example, the data store 130 may include the user information database 132 for storing information related to one or more users of the various products and/or services offered by the organization. In some cases, the user information database 132 may be used to store information related to user behavior associated with a user's activity while interacting with the organization's products and/or services. In some cases, the data store 130 may further include the trusted circle database 134, a life event criteria database 136, a rules repository and/or the like. The entity computing system 110 may utilize these databases to identify a plurality of users of the organization's products and services, identify links between different ones of the users, identify life events associated with one or more users, configure a trusted circle associated with each of a plurality of users, set permissions associated with the users and members of their trusted circle set of search results, to collect historical and current user engagement data, to provide rewards and other incentives and the like.

As mentioned above, the user information database 132 may be used to store information associated with one or more users of the entity's products or services. As such, the user information database 132 may include user specific information and/or user interaction information, such as user interaction with the products, services, and/or departments of the entity. For example, the user information database 132 may include user names, user contact information (e.g., an address, a phone number, an email address, and the like) user demographics (e.g., a marital status, a parental status, a listing of associated family members, an educational status, and the like) and/or user interaction information such as one or more account numbers, a listing of subscribed products or services, financial information, insurance information, educational information, network login information, customer service contact records, and the like. In some cases, one or more data records may include a record ID, a title (e.g., text, graphics, audio, video, mixed media, and the like), a type, contents, one or more categories/subjects, one or more meta tags, a date created, an author, a length (e.g., a number of characters in the content, a file size, and the like), In some cases, the user information database 132 may include information that associates a user with one or more product and/or service categories, and may additionally maintain a hierarchical tree of the categories. As such, the user information database 132 may differentiate users based on one or more high-level categories (e.g., geographic location, business unit contact, product offerings, and the like) from low-level categories (e.g., e.g., an amount of account activity, financial records, transaction records, and the like). For instance, an example high-level category may be a geographic region (e.g., the Midwest, a state, a city, and the like) or a product category (e.g., a banking product offering, an insurance product offering, a product type such as a home improvement service, and the like), and an example low-level category may be a personal credit card, homeowner insurance, an architecture service, a home remodeling service, and the like. Further, the user information database 132 may associate one or more meta tags to particular user information, where the meta tags may be unique terms that correspond to a product or service provided by the entity. In some cases, some or all of the meta tags associated with a user, product or service may be the same as some or all of the categories/subjects associated with an associated category. In examples where a user information record is assigned one or more meta tags, the entity computing system 110 may retrieve a set of search results from another database (e.g., the trusted circle database 134, the life event criteria database 136, the rules repository database, and the like) by matching particular user information records with the meta tags. As such, some or all of the user information records may be associated with meta tags that may be used to generate a set of results that may be used to generate trusted connections between different users. It will be appreciated that one or more of these fields may be designated as mandatory or optional in some illustrative implementations of an entity computing system 110.

As mentioned above, the user information database 132 may store information related to a current user's or a previous user's interactions with the organization's products and/or services. The user information database 132 may be used to store information that has been gathered or tracked relating to interactions via various communication channels and devices, including in-person interactions, public network interactions, private network interactions and the like using mobile devices, tablets, smart phones, mobile phones, desktops, laptops, ATMs, wearable devices, and so forth. As such, the user information database 132 may track information relating to users accessing an organization's services via a mobile application, a mobile browser, a desktop application, a desktop browser, a wearable device application, and so forth. In some examples, the user information database 132 may store metrics associated with a user's interaction with some or all web pages associated with the organization. In other examples, the user information database 132 may store metrics associated with a user's interaction with some or all products and/or services provided by the organization. For instance, the user information database 132 may store a user ID, a username, browser(s) used to access organization's services, language(s) used to access organization's services, computing device(s) used to access organization's services (e.g., a smartphone, a laptop, a tablet, a wearable device, and so forth), screen resolution(s) used to access organization's services, location(s) (e.g., an address, a coordinate, or a generic description, such as coffee shop or home, and so forth) and/or IP address(es) from which organization's products or services were accessed, network speed(s), a number of times the user has accessed a particular page, a number of times the user accesses the same pages from different devices, the date(s) and time(s) at which the user accessed pages, the page(s) which the user has accessed, the referring page(s) (e.g., the pages the user was on before coming to the current page), average time spent on a page, average time spent engaged with an organization's representative in relation to products and services, minimum/average/maximum time spent on page(s), number of single-page visits, time elapsed since last interaction with the current page, and so forth. Additionally, in some cases, some or all user engagement metrics stored in the user information database 132 may be associated with one or more life events identified by the entity computing system 110 based on contextual data received from the external sources 150. Further, in some examples, the user information database 132 may maintain historical values of user engagement data (e.g., user engagement with contextualized set of results), such that the entity computing system 110 may utilize the historical information when identifying user connections and/or life events.

The user information database 132 may store information related to connections determined between users of the entity computing system and/or users of the organization's products and/or services as identified from a plurality of data sources. Examples of data that may be analyzed may include a user's current location, the user's demographic information, the user's educational information, the user's recreational and/or business interests, recent or upcoming life events, user's relationship status, a user's history with the organization, user's employment history, and the like. The user information database 132 may store contextual data attributes according to the most recent update. For example, the user information database 132 may initially store a first user's current location. Following an update to the user's location, the user information database 132 may be updated to store a second user's current location. In other examples, the user information database 132 may maintain historical values of the contextual data attributes. For instance, following an update to the user's employment status, user information database 132 may be appending to include the most recent employment status, such that the user information database 132 maintains a history of the user's employment statuses. In some cases, the user information database 132 may include a user's relationship information corresponding to their immediate family members (e.g., parents, siblings, children, and the like), extended family (e.g., aunts, uncles, grandparents, cousins, step-siblings, step-parents, step-children and the like), and friends and acquaintances (e.g., personal friends, coworkers, employers, educators, advisors, and the like).

In some cases, the data store 130 may include one or more data repositories storing information corresponding to generation and maintenance of a trusted circle of individuals associated with each user (e.g., a trusted circle database 134, and the like) and storing information corresponding to identification of one or more life event trigger, such as by using a life event criteria database 136. In an illustrative example, one or more components of the entity computing system 110 (e.g., the sourcing engine server 120, the match engine server 122, and/or the rules engine server 124 may process one or more algorithms to identify relationship between each of a plurality of users of the organizations products or services. In some cases, the sourcing engine server 120 may process instructions to implement an algorithm provided by the rules engine server 124 to monitor and/or analyze information presented to the public, or in more private, social media communications according to rules provided by the rules engine. Such communications may be analyzed by the sourcing engine to determine a relationship between users using products and services provided by the organization. The sourcing engine server 120 may further analyze relationships found between users based on the information stored in the user information database 132 with or without use using the information obtained from the external sources 150. The trusted circle database 134 may further include user preferences associated with the individuals identified as members of the trusted circle. For example, a user may input, via a user interface screen generated by the user interface generator 116 and/or the network permissions server 126, an access level for each member of their trusted circle, such as by selectively allowing each individual access to their information and/or to allow a person to provide advice in response to life event triggers. For example, a user may include at least two individuals in their trusted circle, where the user allows a first member (e.g., a parent, a sibling, a close friend or relative, and the like) to have full access to their information and/or to provide input and/or advice regarding any life event triggers. In some cases, the user may input a different, (e.g., lesser), access level to a second member (e.g., a teacher, an employer, an advisor, and the like) to allow lesser access to their information or to allow that particular member to provide advice to a specified subset of life event triggers. For example, a user may select a setting that identifies that a particular product or service is being used, but may not allow the member to see any further detail about the product or service use. Similarly, the user may selectively allow a user to provide input to certain life events (e.g., an employment event, a move event). However, the user may selectively deselect particular life events from generating a notification to the same member of their trusted circle (e.g., a parenting life event, a relationship event, and the like).

The life event criteria database 136 may store thresholds and/or rules that may be used by the sourcing engine server 120, the match engine server 122 in determining whether a life event trigger condition has occurred. In some cases, the life event criteria database may include information corresponding to a plurality of life events such as a relationship event (e.g., a marriage event, a divorce event, an engagement event, and the like), a birth event, a death event, a real-estate event (e.g., a purchase, a sale, a home loss event and/or the like), an employment event (e.g., a job offer, a job acceptance, a termination event, a retirement event, and/or the like), and the like. In some cases, the life event criteria database 136 may include information that may be used to identify a life event occurrence, such as a number of postings via one or more social media networks (e.g., the external sources 150) necessary to identify a life event (e.g., one posting, two posting with the same account, one posting on each of two or more social media networks or accounts, and the like).

Additionally, in some cases, the data store 130 may be used to store computer-executable instructions to cause a computing device (e.g., the user interface generator 116, the encryption engine 118, the sourcing engine server 120, the match engine server 122, the rules engine server 124, the network permissions server 126, and/or the user reward server 128) to facilitate identification of one or more individuals for inclusion in a user's trusted network, obtaining information from a plurality of external sources 150, analyzing the information received from the plurality of external sources, identifying a life event trigger, notification of one or more members of the user's trusted network in response to the life event trigger, receiving information from the one or more members to the user's trusted network in response to the life event trigger, generating one or more user interface screens for presenting information to a user, communicating the one or more user interface screens to a user device 170, generating and/or presenting information concerning an earned reward in response to a response to a life event trigger, and the like.

In some cases, the trusted circle database 134 may be used to store output from one or more customer matching algorithms employed by the rules engine server 124 and/or the sourcing engine server 120 and/or the matching engine server 122. Such algorithms may leverage stored customer information such as age, assets, geography, and life milestones (e.g., marital status, retirement status, parental status, and the like) that may be retrieved from the user information database 132, as well as information obtained from one or more of the external sources 150 by the from the sourcing engine server 120 (e.g., social interests, health information, and the like) to identify potential matches with other users of the products and services of the organization for the purpose of communicating on the entity supported secure network 162 and any associated messaging platform. In some cases, the matching engine server 122 may perform a configuration process for each user, including social network profiles and/or login information for each social network. In some cases, a secure profile of trusted friends and family may be identified by the user or determined based on an analysis of social network activity. In some cases, friends and/or family may be suggested by the matching engine server 122 to be added and approved by the user via one or more user interface screens.

In some cases, one or more user preferences may be captured by the network permissions server 126, such as via a user interface screen generated by the user interface generator 116. For example, the network permissions server 126 may be used to request from one or more users a program opt-in status/date, consent status for each potential match as output from the match engine server 122, and extent of the user profile information to share. For example, the permissions server 126 may receive a configuration input from a user, such as via a communicated user interface screen, to enable various permissions associated with each member of the trusted circle. For example, the permissions may allow sharing information associated with a product subscription, may suppress an undesirable payment status, and/or may obscure values of particular assets. In some cases, the customer preferences stored in the trusted circle database 134 may be modified in a channel-agnostic fashion and/or a device agnostic fashion, including a means of requesting network connection with specific customers via the secure network 162. In some cases, a permissions hierarchy may be defined to allow user to configure which friends, family or other members of the trusted circle are to be allowed to offer advice. The user can selectively approve and/or block members from all life events or selected life event triggers. In some cases, a grading interface may be used to allow advice to be graded and used to assign a rating to each member of the trusted circle based on self-reported scores and/or scores from others.

In some cases, the user reward server 128 may be used to store in data repository of advice ratings, such as the trusted circle database 134. The rewards server may present a rating user interface screen to a user via the secure network 162 for display on a display of the one or more user devices 170. The ratings may be a numerical rating, a letter rating, a textual rating, or a visual rating (e.g., a 1-5 star scale or the like) and may be used to inform future rules engine assessment values, periodic reassessment values for matched members of the trusted network and/or the users associated with each trusted network, and/or recommendation criteria for subsequent and ongoing match considerations.

In some cases, communication between the sourcing engine server 120 and/or the social media networks comprising the external sources 150 may be analyzed to detect one or more life event triggers that may cause solicitation (e.g., a pull request, a push request) of advice for the user from the one or more members of the trusted circle. The sourcing engine server 120 may store a database of information corresponding to a plurality of users including, for example, prior life events, ratings and/or scores associated with each life event, and/or the like. The match engine server 122 may be used to link users together based on the life event triggers, personal connections, professional connections, and/or the like.

In some cases, the secure network 162 may be used by a plurality of users for secure communication, such as by using encoded data communicated over a private network. The encoded messages may be communicated via the secure network 162 and may be encrypted by the encryption engine 118 of the entity computing system 110 using one or more encryption algorithms, such as an asymmetric encryption algorithm, a block cipher, an encryption key, a symmetric encryption algorithm, and/or the like.

In some cases, the entity computing system, for each identified life event trigger, may provide information to one or more users, such as via a user interface screen on a mobile device or other remote interface associated with the user, such as the user devices 170. The user interface screen may be generated by the user interface generator and be communicated to the user device 170 via one or more network connections, such as the Internet and/or the secure network 162. The user interface screens may be used by the user to identify which members of the user's trusted circle can be solicited for advice, such as by reviewing presented ratings (e.g., grades) information. In some cases, based on permissions associated with the users, some members of the trusted circle may be notified when one or more life event triggers have been identified and then these trusted members of the trusted circle may be allowed to give advice and/or may ask the user whether they desire advice. In some cases, access may be granted to the secure network 162 based on user approval. The user may be presented a user interface screen (e.g., a graphical user interface screen and the like) that may be used to enter information concerning users (e.g., friends, family members, coworkers) which are to be added as members of the trusted circle that may provide advice. In such systems, user interactions with the business entity computing system may be minimized and may simplify user interactions with the entity computing system (e.g., financial transactions). In some cases, the systems and methods discussed herein may be used on a "pay it forward" concept where users of social media content may be assisted in addressing one or more life event triggers. The users may be able to rate themselves on how certain life events have been handled and in which advice can be offered to others in their trusted network.

Figure 2:
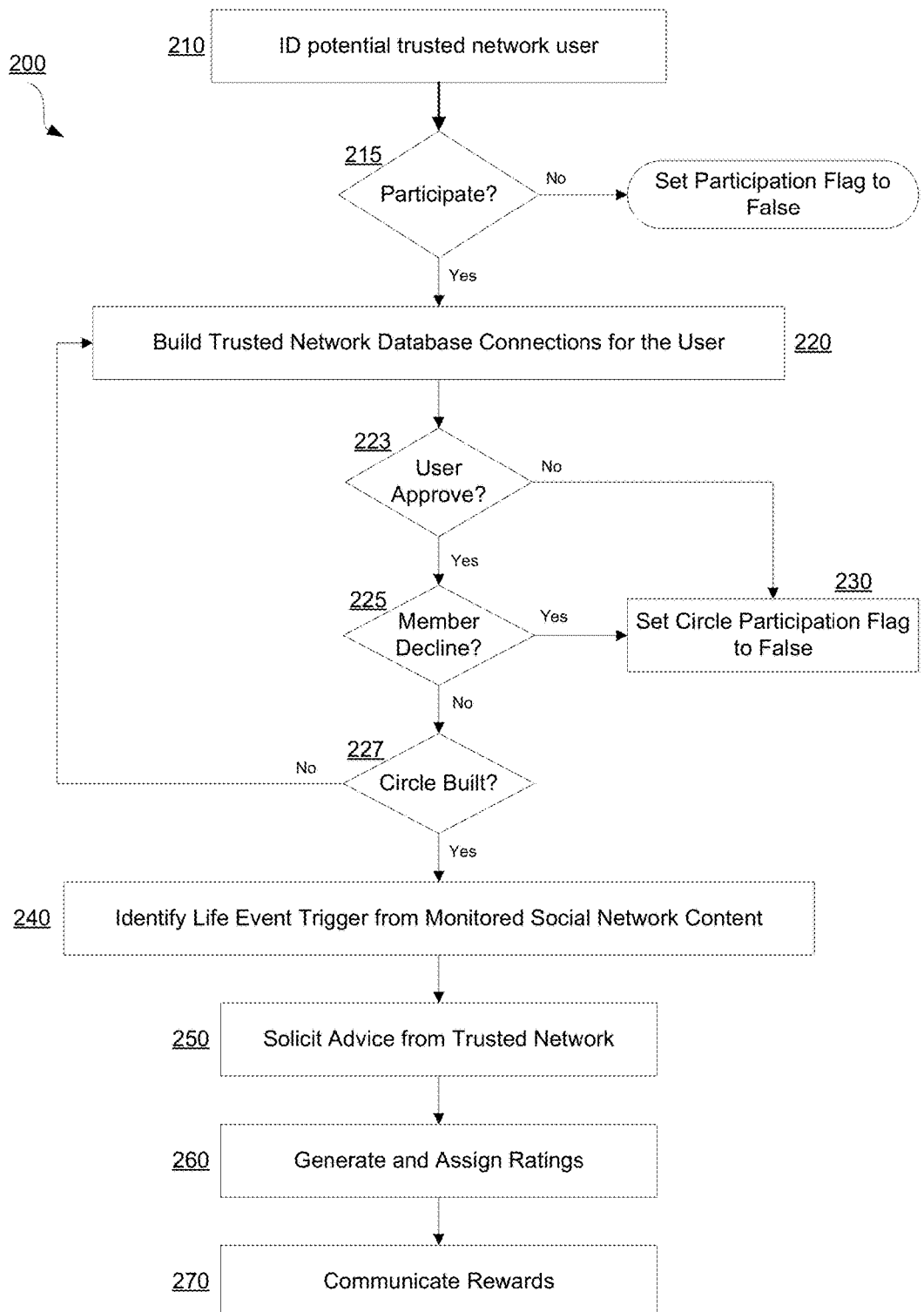
FIG. 2 shows a flowchart of an illustrative method for generating a trusted group of individuals corresponding to a particular user for providing input in response to a triggering event in accordance with one or more aspects described herein.

FIG. 2 shows a flowchart of an illustrative method 200 for generating a trusted circle of individuals corresponding to a particular user for providing advice in response to a triggering event in accordance with one or more aspects described herein. At 210, a computing system, such as the entity computing system 110 of FIG. 1 may be configured to identify individuals that may be a user of products and/or services provided by a business entity and may desire to receive advice from members of a trusted network. Each identified user may be asked whether they desire to participate, at 215. If not, the computing system may set a Boolean flag, such as a participation flag, to false. If so, at 220, the Boolean participation flag may be set to true while the entity computer system 110 may process instructions to build a user network of trusted individuals. For example, the entity computing system 110 may access a data repository, for storing information associated with each member of the trusted user network, the so-called "trusted circle". The data store 130 may include a user information database 132 in which user information may be stored and accessed and a trusted circle database 134 in which a customer matching algorithm accessed from the rules engine server 124 and processed by the match engine server 122. The algorithm provided by the rules engine server 124 may use a variety of data elements, such as age, geographic location, known life milestones including a marital status or a parental status, one or more social interests, and health information as received from one or more external sources 150, such as social media networks. Such information may be used to match a user (e.g., a customer of the business entity and the like) to other clients of the business entity for communication via the secure network under the business entity's control (e.g., a business supported messaging platform).

In some cases, the match engine server 122 may be used to match users with other individuals, whether or not the other individuals are previously known to the user. At 223, the user may approve or disapprove of the match. If, at 223, the user disapproves of the match, a flag, such as a circle participation flag, may be set to false at 220. If, at 223, the user approves of the match, the individual may be given the opportunity to approve or disapprove of participating as a member of the user's trusted circle at 225. If the member disapproves of participating, the circle participation flag may be set to false by the match engine server 122. If, at 225, the member approves of participating in the trusted circle, the match engine server 122 may determine whether or not the user's trusted circle has been completed, such as by soliciting a response from the user via a user interface screen communicated via a network (e.g., the Internet 160) to one or more of the user devices 170. If, at 227, the circle has not been completed, the match engine server 122 continues to identify individuals for inclusion in the user's trusted circle at 220. If, at 227, the user indicates that the circle has been completed, the sourcing engine server 120 may analyze a plurality of social media posts via the Internet 160 to determine whether a life event trigger has occurred at 240. In some cases, at 227, the user may trigger a circle update and/or the circle of trusted users may be updated automatically. For example, a circle of trusted users may be generated at a particular point in time for a user and, over time, the user may decide to add or remove individuals from membership from the trusted circle. The user may remove the individuals manually (e.g., a selection via a user interface screen), or the users may be removed automatically (e.g., an individual who has not provided input to a user for a predetermined length of time, such as 1 year).

In some cases, the match engine server 122 may be configured for matching people up with individuals unknown to the user for inclusion in the user's trusted network. A such one or more preferences may be stored in the data store 130. For example, a preference may indicate whether the user or other individual has opted-in to participate in a trusted circle program, such as by using the participation flag, and a date upon which approval has been elected may also be stored. This may be repeated for all individuals so that consent may be stored for each individual. The user may also be able set preferences, such as by using the network permissions server, so that the user may limit how much information may be made available to each individual member of the trusted circle. In some cases, each user may set the same permissions for each member of their trusted circle. In other cases, the user may individually set permissions for one or more members of the trusted circle. For example, the user may desire to share which products or services provided by the business entity with the members of the trusted circle, but may not desire to disclose monetary amounts, asset information, transactional information and/or whether use of the products and services have been timely. The network permissions server 126 may be configured to change user preferences and/or trusted circle member access levels in a device and/or communication channel agnostic fashion. In some cases, the network permissions server 126 may be configured to communicate to a plurality of device types (e.g., mobile devices, tablet devices, computing devices, a wearable device, a smart car computing system, and/or the like) and/or a plurality of channels (e.g., a web service, a mobile application, a specialized software application, and/or the like).

In some cases, the user (e.g., a customer of the business entity) may desire to invite particular individuals to be members of their trusted network. For example, the match engine server 122 may communicate a user interface screen to the user on which the user may enter contact information, and other user preferences, in relation to the particular individuals to invite to join their trusted network. In such a way, the user may be able to reach out to invite a family member, a friend, a coworker, and the like, instead of waiting for the business entity to recommend these individuals. In some cases, a user may request that a non-customer of the business entity to become a member of their trusted circle. In such cases, the user may provide the information and the network permissions server 126 may provide information to the requested member so that the member may become a customer of the business entity, if they so desire. If not, the network permissions server 126 may be configured to grant proper permissions (e.g., a user name, a password, and the like) so that the requested user may log into the secure network 162 with or without becoming a customer of the business entity.

At 240, the sourcing engine server 120 may monitor a plurality of social media posts (e.g., posts on a messaging social media network, posts on an image-based social media network, and the like) to identify posts associated with activities performed by the user. The sourcing engine server 120 may process the plurality of monitored posts that have been identified as being associated using a plurality of rules provided by the rules engine server and/or life event criteria stored in the life event criteria database. If a life event trigger (e.g., a birth event, a death event, an employment event, a financial event, and the like) has occurred, or is predicted to occur, the sourcing engine server 120 may communicate one or more user interface screens generated by the user interface generator 116 to members of the trusted circle based on the preferences stored in the trusted circle database 134 to solicit advice from the members of the trusted network at 250. In some cases, the user or system may solicit advice from the members of the trusted circle. In some cases, the members of the trusted circle may provide advice in response to the identified life event trigger without being solicited by the user or system.

At 260, after the members of the trusted circle have provided the advice via one or more user interface screens to the user, the user may provide ratings to each member who provided advice. In some cases, as people give advice, the members may be presented with a user interface screen in which they may provide a self-rating, such as by using a simplistic scale (e.g., 1-5, 1-5 stars, and the like). The ratings information may be stored in the trusted circle database 134 for use in generating future assignments from the rules engine and/or in periodic re-assessments to previous matched trusted network assignments. For example, an algorithm stored in the rules engine may provide a match of user A to member B. At a future date (e.g., a year later), events may have occurred such that user A is no longer compatible to member B, so that the rules engine algorithms may be reprocessed by the match engine server 122 based on the ratings and would regenerate the matches based on the new criteria.

At 270, one or more rewards may be provided to users who participate and give good advice. In some cases, the user reward server 128 may provide a reward or other mechanism for customers of the business entity to see which users participate and provide good advice. In some cases, the reward may provide a ranking system such that the trusted network members who provide the most helpful advice receive the highest rankings. In some cases, the reward server 128 may provide monetary rewards or non-monetary rewards. For example, a reward include complementary access to products and/or services offered by the entity.

Figure 3:
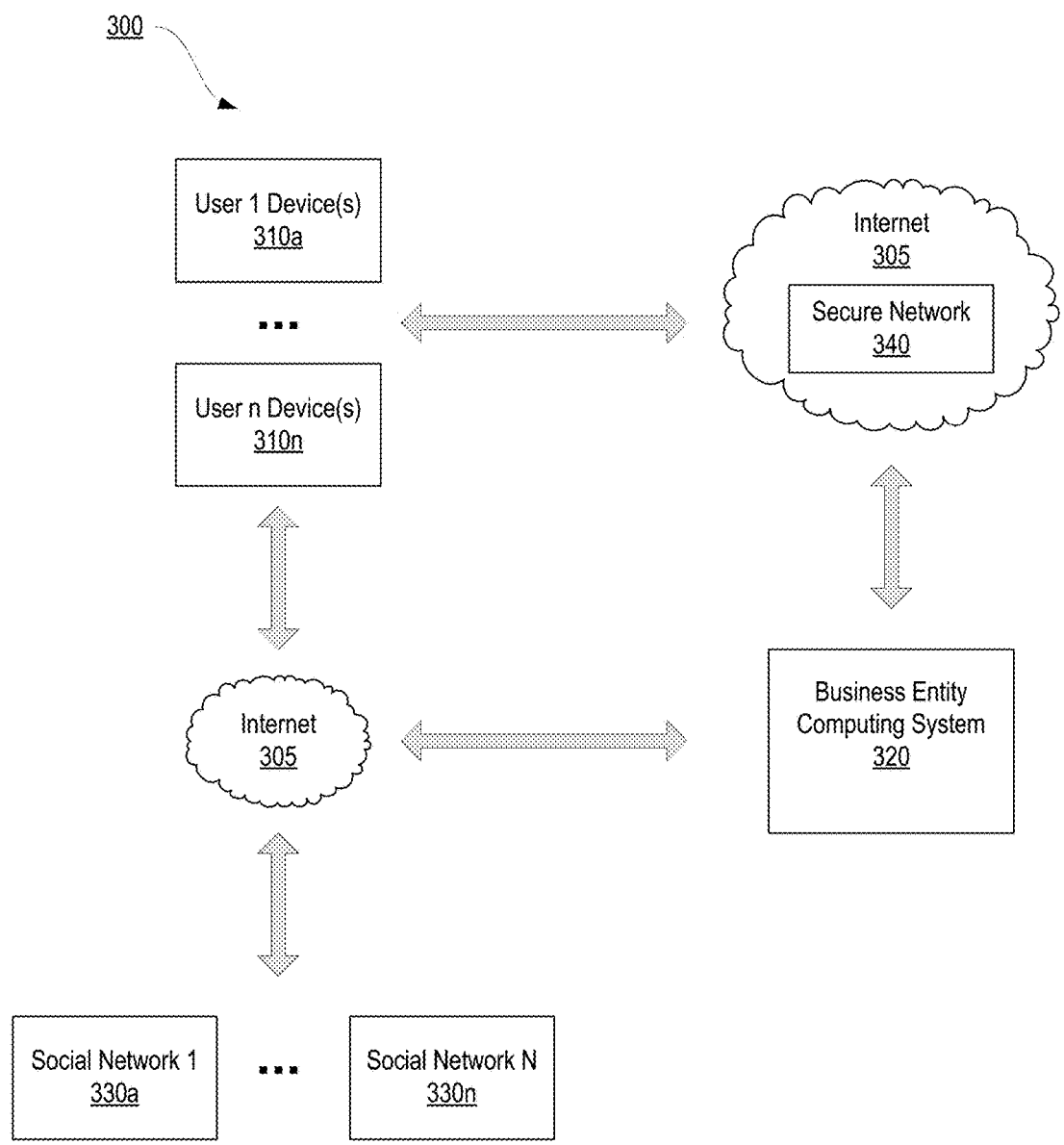
FIG. 3 shows an illustrative computing environment including a secure communication network provided by an organization in which a trusted group of individuals may provide input in response to an identified event trigger associated with a user in accordance with one or more aspects described herein.

FIG. 3 shows an illustrative computing environment 300 including a secure communication network provided by an organization in which a trusted circle of individuals may provide advice in response to an identified life event trigger associated with a user in accordance with one or more aspects described herein. For example, one or more users may user the user devices 310a, 310n to communicate via the Internet 305 to one or more social networks (e.g., social network 330a, social network 330n, and the like). The users may be customers of a business entity, or may be participating in a trusted network of a customer of the business entity, such that the business entity computing system 320 may monitor communications and/or posts made by the users on the social networks 330a, 330n. The business entity computing system 320 may analyze the social network communications and/or posts based on rules and/or criteria to determine one or more life event triggers associated with a user. In response to the identified life event triggers, the business entity computing system may facilitate the user requesting advice from one or more members of their trusted network based on predetermined criteria and preferences. In some cases, the members of a user's trusted network may provide advice without being solicited when a life event trigger has been identified. The users may communicate via a secure network 340 provided by the business entity to provide a secure communication channel that may employ one or more encryption techniques. The users may provide ratings via a user interface screen provided by the business entity computing system 320 to rate a quality of the advice given and/or received. In some cases, rewards may be offered to users who provide a specified quantity of advice, where the advice meets predetermined ratings criteria.

Figure 4:
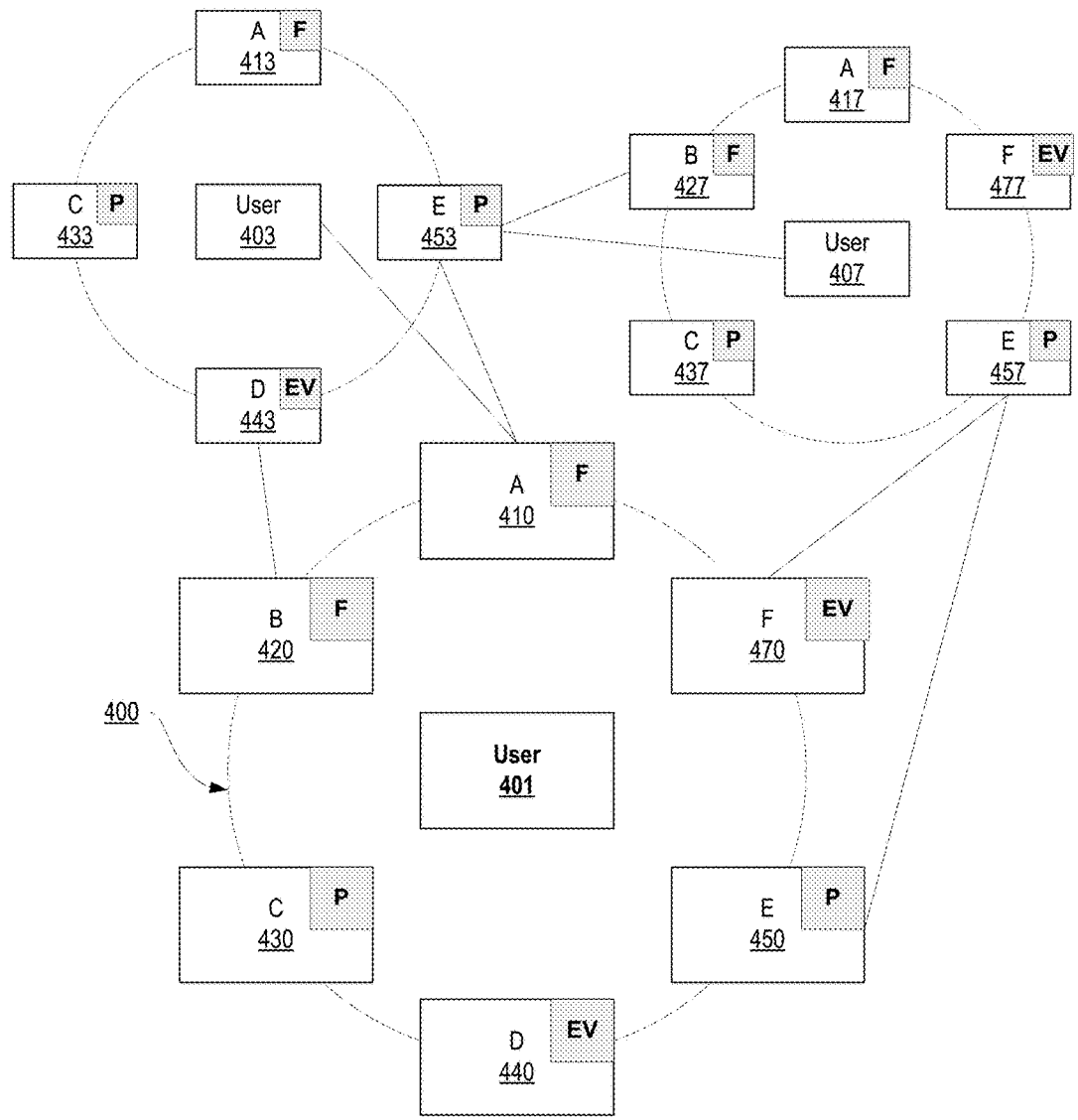
FIG. 4 shows an illustrative data structure representation of a trusted group of individuals associated with an individual in accordance with one or more aspects described herein.

FIG. 4 shows an illustrative data structure representation of a trusted circle of individuals associated with an individual in accordance with one or more aspects described herein. For example, information associated with a user 401 may be analyzed to identify one or more other individuals for inclusion into a trusted circle. In some cases, the individuals may be known to the user 401. In other cases, one or more of the individuals may be previously unknown to the user, but may have been matched based on criteria and/or algorithms processed by the match engine server 122. In some cases, the user may assign access rights to view private user information, such as account information, health information, financial information, and the like. For example, individuals 410 and 420 have been granted full access rights to the user's private information, individuals 430 and 450 have been granted partial access to the user's private information, where the user or the business entity may control which user information may be accessible. Individuals 440 and 470 have been granted access to information related to a particular event type (e.g., a parental event, an employment event, and the like). In some cases, the user 401 may be connected to individuals who have connections to individuals within the trusted circle 400. For example, the trusted individual 420 may be connected to individual 443 and may introduce or otherwise refer individual 443 to user 401 such that the user 401 may include individual 443 as a member or temporary member of the trusted circle 400. Similarly, the user 407 other connections and/or referrals may occur between trusted circle members as shown in FIG. 4.

Figure 5:
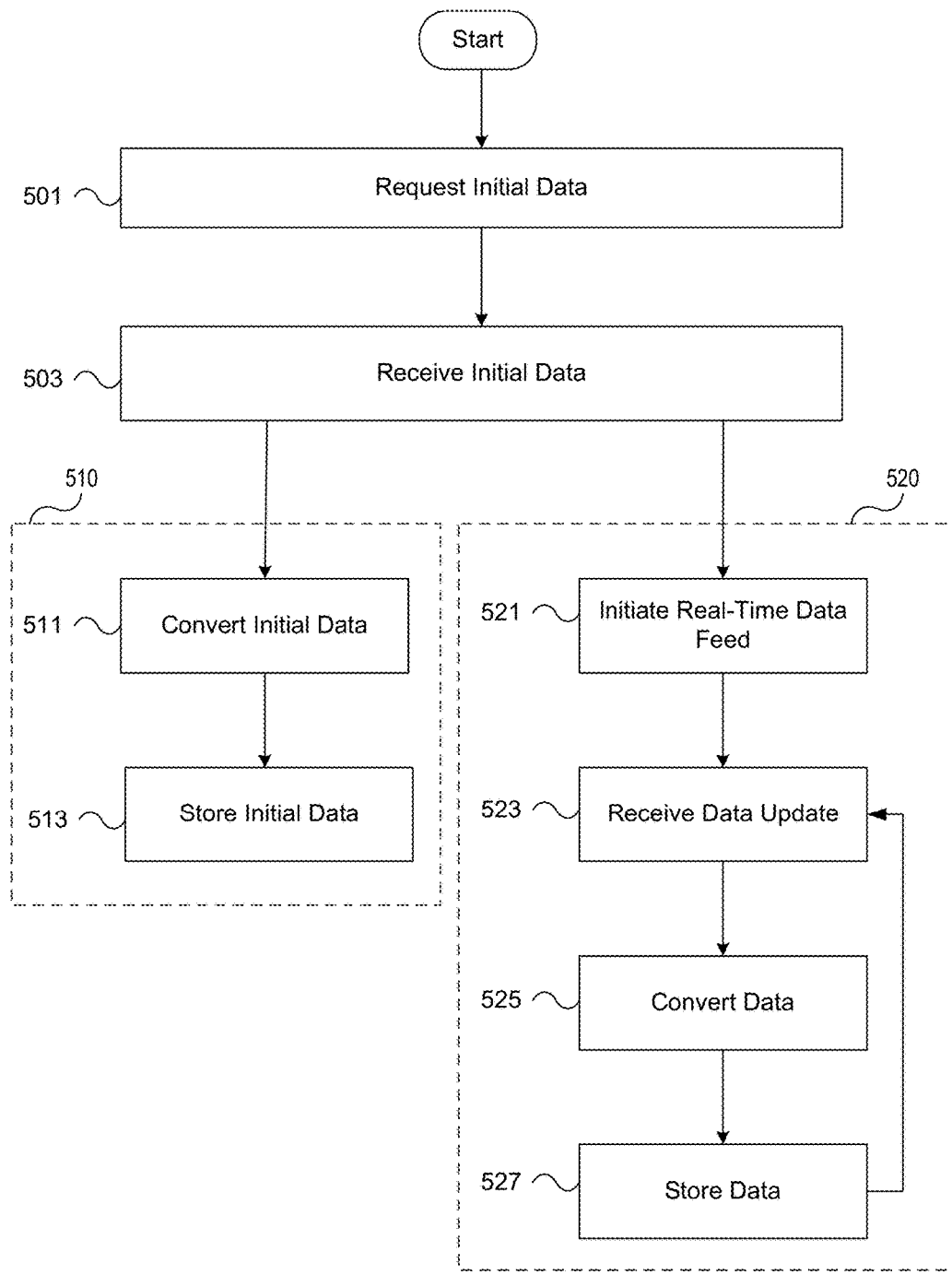
FIG. 5 shows an illustrative method for sourcing user-related data in accordance with one or more aspects described herein.

FIG. 5 depicts an illustrative method for sourcing user-related data from one or more information sources that may be utilized by the sourcing engine 601 (e.g., the sourcing engine server 120). The sourcing engine 601 may be maintained by an enterprise. The illustrative sourcing method may be executed separately for each user of the enterprise. Alternatively, the illustrative sourcing method may be executed in batch mode, wherein each step is simultaneously performed for multiple users. At step 501, the sourcing engine 601 may request initial data for a first user from one or more data source. The sourcing engine 601 may include an authentication token in the request for initial data. The contents of the authentication token may vary depending on the type of authentication required by the data source to which the request for data is sent.

The sourcing engine 601 may request data from multiple sources of data. For example, the sourcing engine 601 may transmit a first request for data associated with the first user to a first source of data and a second request for data associated with the first user to a second source of data. The sourcing engine 601 may transmit the first request and the second request in parallel or sequentially. The first request and the second request is for illustrative purposes, and a greater number of requests or a fewer number of requests may be transmitted by the sourcing engine 601 depending on the number of data sources available for the first user.

The sources of data may be internal (e.g., maintained by the enterprise) or external (e.g., not maintained by the enterprise). External data sources may include, but are not limited to, social media websites, and wearable and/or Internet of Things devices (e.g., smartphone, smartwatch, fitness trackers, and the like). The sourcing engine 601 may generate independent initial requests for data for each data source, such that a request for initial data sent to a data source is properly customized and formatted for that data source.

In a first instance, the sourcing engine 601 may send a first request for initial data for a first user to a first data source at step 501. The first data source may be an external data source. The first data source may be a first social media website. The first social media website may allow users to create a user profile. Users of the first social media website may then connect to other users, share posts, photos, videos, and news stories, exchange private messages, and join various groups. The sourcing engine 601 may send the first initial request data to a first application programming interface (API) provided by the first social media website. The first API may be a HTTP-based API that may be used to query data from the first social networking website. The first API may include nodes, edges, and fields. The nodes may represent elements of the first social networking web site, such as a user or a photo. The edges may represent connections between the nodes, such as comments made on a photo. The fields may represent information about the nodes, such as a user's birthday or gender. The sourcing engine 601 may include access tokens in the first request for initial data. The specific access tokens in the first request for initial data may vary on the type of data that is requested.

The nodes, fields, and edges in the first API may be read with an HTTP "Get" request. The first request for initial data made to the first data source sent by the sourcing engine 601 may include a data field identifying the user for which the data is requested. The sourcing engine 601 may further include specific fields or edges within the first request for initial data. For example, the sourcing engine 601 may request one or more of the first user's ID, age, biography, birthday, a list of iOS and Android devices the user is using, education, email address, name, gender, hometown, locale, relationship status, significant other, updated time, website, work experience, and the like. In certain instances, the first user may have configured privacy or permission settings within the first social networking website such as one or more of these fields or edges are not accessible to the sourcing engine 601 via the first API.

Continuing with the first instance, the sourcing engine 601 may further send a second request for initial data for the first user to a second data source at step 501. The second data source may be an external data source. The second request for initial data may be transmitted prior to, simultaneous to, or subsequent to the first request for initial data. The second data source may be a second social media website. The second social media website may allow users to create a user profile. Users of the second social media website may then send and read messages. A first user of the second social media website may subscribe or follow other users, such that messages posted by the other users can be viewed by the first user.

The sourcing engine 601 may send the second request for initial data to a second API provided by the second social media website. The second API may be a HTTP-based API that may be used to query data from the second social networking website. The second API may be comprised of objects, including, but not limited to, users, messages, entities, and places. Users may be individuals or units that have created a user profile within the second social media website. Messages may be the messages that are posted or shared by users of the second social media website. Places may be locations with geographical coordinates that may be associated with a message (e.g., a message may be posted from a place) or the subject of a message (e.g., a message may be posted about a place). Entities may provide metadata and additional contextual information about content posted on the second social media website. The sourcing engine 601 may include access tokens in the second request for initial data. The specific access tokens in the second request for initial data may vary on the type of data that is requested.

The objects in the second API may be read with an HTTP "Get" request. Each of the objects may have one or more fields. These fields may also be read by the sourcing engine 601 via an HTTP "Get" request. For example, regarding a "user" object, the sourcing engine 601 may request data for fields including, but not limited to, the date the user's account with the second social media website was created, a user-provided description of the user's account, the accounts being followed by the user, the number of followers of the user's account, whether the user has enabled geotagging of messages, the user's ID, the location associated with the user's account, a user-provided name, a time zone the user declares themselves in, a URL provided by the user in association with their profile, and the like. The second request for initial data sent by the sourcing engine 601 to the second data source may include a data field identifying the user for which the data is requested. The sourcing engine 601 may further include objects and fields within the second request for initial data. In certain instances, the first user may have configured privacy or permission settings within the second social networking website such as one or more of these objects or fields are not accessible to the sourcing engine 601 via the second API.

Continuing with the first instance, the sourcing engine 601 may further send a third request for initial data for the first user to a third data source at step 501. The third data source may be an external data source. The third request for initial data may be transmitted prior to, simultaneous to, or subsequent to, one or more of the first request for initial data and the second request for initial data. The third data source may be a third social media website. The third social media website may allow users to create a user profile. The user profile may be directed to the education history of the user, the career history of the user, the user's current employment information, and the user's skills. Users of the third social media website may connect with other users and may further exchange messages with other users.

The sourcing engine 601 may send the third request for initial data to a third API provided by the third social media website. The third API may be a HTTP-based API that may be used to query data from the third social networking website. The sourcing engine 601 may access, via the third API and for a user of the third social media website, basic profile fields, location fields, and position fields. Basic profile fields for a user of the third social media website may include, but are not limited to, the user's name, physical location, the industry the user belongs to, the most recent item the member has shared on the third social media website, the number of connections the user has on the third social media website, a summary of the user's professional profile, a summary of the user's specialties, the user's current position, and the user's email address. Location fields for a user of the third social media website may include, but are not limited to, a generic user-provided description of the user's location, and a country code representing the user's current country. Position fields for a user of the third social media website may include, but are not limited to, the title of the user's employment position, a summary of the employment position, a date indicating when the employment position began, a date indicating when the employment position ended, a Boolean value indicating whether the user is currently in this employment position, and a description of the company the employment position belongs to.

Continuing with the first instance, the sourcing engine 601 may further send a fourth request for initial data to one or more databases. The one or more databases may be internal data sources. The one or more databases may store information associated with the first user. The information associated with the first user may include tracking or logging data from the first user's interactions with one or more online portals and/or web applications maintained by the enterprise. The first user may interact with the online portals and/or web applications maintained by the enterprise via one or more computing devices. For example, the enterprise may provide an online portal to its users. The online portal may provide information associated with the user's account(s) with the enterprise. For example, the user may have a checking account and a savings account with the enterprise. The online portal presented to the user may include information on the user's checking account and savings account. The online portal may further provide information on other products and services provided by the enterprise. For example, the online portal may include information on the types of brokerage accounts offered by the enterprise (even though the user may not currently have a brokerage account with the enterprise). In some cases, a life event being experienced or that may be predicted to soon be experienced may be identified for the user based on one or more interactions with the online portal and/or through the user's interactions with one or more social networks.

The user's interaction with the online portal may be tracked and/or logged. For example, if the user expresses an interest in brokerage accounts offered by the enterprise (by clicking on a brokerage account link presented in the online portal), that information may be tracked and logged by the online portal. In another example, if the user updates account information via the online portal, the updated information may be tracked and logged by the online portal. The user's interaction with the online portal may be tracked across multiple platforms. For example, the user may log onto the online portal from a first computing device, such as a laptop device. The user may further log onto the online portal from a second computing device, such as a cellular device. The online portal may track the user's interaction with the online portal via both the first computing device and the second computing device. The user's tracking information from the first computing device may be tagged with an identifier identifying the first computing device prior to storage. Similarly, the user's tracking information from the second computing device may be tagged with an identifier identifying the second computing device prior to storage. All tracking information from the online portal may be logged (e.g., stored) within one or more internal databases maintained by the enterprise. The sourcing engine 601 may send the fourth request for initial data to the one or more databases that stores the logged information for that user.

In a second instance, the sourcing engine 601 may, at step 501, send batch or bulk initial requests for data to the one or more of the four data sources discussed above in reference to the first instance. That is, in the second instance, the sourcing engine 601 may sent a first batch request to the first data source (e.g., the first social media website). The first batch request may be viewed as a plurality of initial requests for data included in a single batch request for initial data. That is, the first batch request may include a first request for initial data for a first user and a second request for initial data for a second user. The sourcing engine 601 may similarly send a second batch request to the second data source (e.g., the second social media website), a third batch request to the third data source (e.g., the third social media website), and a fourth batch request to the fourth data source (e.g., the one or more internal databases). The first, second, third, and fourth batch requests may be transmitted in parallel or sequentially.

At step 503, the sourcing engine 601 may receive a set of initial data in response to the requests for initial data transmitted at step 501. The sourcing engine 601 may receive multiple sets of initial data. Each set of initial data may be received from a different data source.

Continuing with the first instance, the sourcing engine 601 may receive a first set of initial data from the first data source to which the sourcing engine 601 sent a first request for initial data (e.g., the first social media website). The sourcing engine 601 may receive a second set of initial data from the second data source to which the sourcing engine 601 sent a second request for initial data (e.g., the second social media website). The sourcing engine 601 may receive a third set of initial data from the third data source to which the sourcing engine 601 sent a third request for initial data (e.g., the third social media website). The sourcing engine 601 may receive a fourth set of initial data from the fourth data source to which the sourcing engine 601 sent the fourth request for initial data. The sourcing engine 601 may tag each set of initial data with the data source that sent that set of initial data. The sourcing engine 601 may determine the data source that sent a set of initial data based on the contents of the initial data (e.g., the contents themselves may indicate the data source) or based on the address from which the set of initial data was received.

Continuing with the second instance, the sourcing engine 601 may receive a first batch set of initial data from the first data source to which the sourcing engine 601 sent a first batch request for initial data (e.g., the first social media website). The sourcing engine 601 may receive a second batch set of initial data from the second data source to which the sourcing engine 601 sent a second batch request for initial data (e.g., the second social media website). The sourcing engine 601 may receive a third batch set of initial data from the third data source to which the sourcing engine 601 sent a third request for initial data (e.g., the third social media website). The sourcing engine 601 may receive a fourth batch set of initial data from the fourth data source to which the sourcing engine 601 sent a fourth request for initial data (e.g., the one or more internal databases). The sourcing engine 601 may tag each batch set of initial data with the data source that sent that set of initial data. The sourcing engine 601 may determine the data source that sent a batch set of initial data based on the contents of the batch set of initial data (e.g., the contents themselves may indicate the data source) or based on the address from which the batch set of initial data was received.

Processing may then proceed to modules 510 and 520. The sourcing engine 601 may execute modules 510 and 520 in parallel or sequentially. At step 511, the sourcing engine 601 may convert the initial data received at step 503 into a common format. As noted above, the initial requests for data transmitted by the sourcing engine 601 may be directed to different data sources, and the initial sets of data received by the sourcing engine 601 may be from different data sources. Therefore, the sets of initial data may each be formatted differently, depending on the data source from which the set of initial data was transmitted.

A different conversion engine (described below in reference to FIG. 6) may be used for each data source. That is, a set of initial data from a first data source may be converted to the common format via a first conversion engine 611, whereas a set of initial data from a second data source may be converted to the common format via second conversion engine 612. The sourcing engine 601 may analyze the tag assigned to each set of initial data at step 503. Depending on the contents of the tag, the sourcing engine 601 may then transmit that set of initial data to the appropriate conversion engine.

Continuing with the first instance, based on the contents of the tag of the first set of initial data, the sourcing engine 601 may transmit the first set of initial data to a first conversion engine 611. Prior to transmitting the first set of initial data to the first conversion engine 611, the sourcing engine 601 may set a flag indicating that the first set of initial data corresponds to the first user. Based on the contents of the tag of the second set of initial data, the sourcing engine 601 may transmit the second set of initial data to a second conversion engine 612. Prior to transmitting the second set of initial data to the second conversion engine 612, the sourcing engine 601 may set a flag indicating that the second set of initial data corresponds to the first user. Based on the contents of the tag of the third set of initial data, the sourcing engine 601 may transmit the third set of initial data to the third conversion engine 613. Prior to transmitting the third set of initial data to the third conversion engine 613, the sourcing engine 601 may set a flag indicating that the third set of initial data corresponds to the first user. Based on the contents of the tag of the fourth set of initial data, the sourcing engine 601 may transmit the fourth set of initial data to a nth (e.g., a fourth) conversion engine 614. Prior to transmitting the fourth set of initial data to the fourth conversion engine 614, the sourcing engine 601 may set a flag indicating that the fourth set of initial data corresponds to the first user. Similarly, continuing with the second instance, based on the contents of the tag for the first batch set of initial data, second batch set of initial data, third batch set of initial data, and fourth batch set of initial data, the sourcing engine 601 may send the first batch, second batch, third batch, and fourth batch to the first conversion engine 611, second conversion engine 612, third conversion engine 613, and fourth conversion engine 614, respectively. The transmittal of the first batch set of initial data to the first conversion engine 611 may include a flag indicating that the first batch set corresponds to a first set of users. The transmittal of the second batch set of initial data to the second conversion engine 612 may include a flag indicating that the second batch set corresponds to a second set of users. The transmittal of the third batch set of initial data to the third conversion engine 613 may include a flag indicating that the third batch set corresponds to a third set of users. The transmittal of the fourth batch set of initial data to the fourth conversion engine 614 may include a flag indicating that the fourth batch set corresponds to a fourth set of users. The first, second, third, and fourth set of users may include the same users or different users. In some cases, the set of users may include a trusted network of individuals for a user, a subset of a circle of trusted individuals associated with the user, and the like. Each conversion engine may then convert the inputted set of initial data or the inputted batch set of initial data to the common format (discussed below in reference to FIG. 3). At step 513, the converted data from each conversion engine may be stored within a common data module repository 620 (discussed below in reference to FIG. 6).

At step 521 of module 520, the sourcing engine 601 may initiate real-time or near real-time data feed from each data source. Once the sourcing engine 601 has received a set of initial data for a select user from a select data source, sending repeated requests for data for the select user to the select data source is inefficient and duplicative. That is, if the select user has not updated their user profile at the select data source or had any activity at the select data source, there is no new data for the select user at the select data source. Accordingly, configuring the sourcing engine 601 to send repeated requests for data for the select user for the select data source will result in no data being returned from the select data source. Accordingly, it may be advantageous to initiate a real-time or near real-time data feed for the select user from the select data source. In this configuration, if the select user updates their profile at the select data source or if there is any activity within the select user's account at the select data source (for example, continuing with the first instance, if the select user changes a relationship status at the first social media website, or posts a message on the second social media website, or updates an employment status at the second social media website), the select data source will automatically send a set of updated data to the sourcing engine 601.

Continuing with the first instance, the sourcing engine 601 may initiate a first real-time or near real-time data feed for the first user at the first data source (e.g., at the first social media website). The sourcing engine 601 may configure the first real-time or near real-time data feed for the first data source via the first API provided by the first data source. The sourcing engine 601 may provide the first API with a first callback URL. The sourcing engine 601 may further provide the first data source with a list of objects and fields to monitor. When there is a change in any of the objects or fields designated by the sourcing engine 601, the first data source will automatically send an update to the first callback URL. The update from the first data source may include an indication of the object type that the update relates to, the list of changes, an array of the fields that have changed to trigger the update, and a timestamp indicating when the update was sent. The sourcing engine 601 may further initiate a second real-time or near real-time data feed for the first user at the second data source (e.g., at the second social media website). The sourcing engine 601 may initiate the second real-time or near real-time data feed for the first user at the second data source via a streaming API provided by the second data source. The streaming API may be the same as or different than the second API provided by the second data source (discussed above in reference to step 501). The sourcing engine 601 may initiate the second real-time or near real-time data feed via the streaming API using a "Get" HTTP command specifying the user and the types of updates requested (for example, the sourcing engine 601 may select to receive information for just the first user or to also receive messages from accounts the first user follows). The sourcing engine 601 may initiate a third real-time or near real-time data feed from the third data source for the first user. The sourcing engine 601 may integrate with a library provided by the third data source. The library may provide APIs for different real-time data change streams, and the sourcing engine 601 may select the API that corresponds to the data stream that the sourcing engine 601 requires updates from.

The sourcing engine 601 may initial a fourth real-time or near real-time data feed from the fourth data source for the first user. The sourcing engine 601 may configure the fourth real-time or near real-time data feed via direct communication with the one or more databases on which the information from the online portal is logged. Alternatively, the sourcing engine 601 may configure the fourth real-time or near real-time data feed via communication with one or more servers or computing devices provided by the enterprise.

At step 523, the sourcing engine 601 may receive one or more updates from any of the four real-time or near real-time data feeds established at step 521. The sourcing engine 601 may tag each of the received updates with an indication of the data source that that update was received from. The sourcing engine 601 may determine the data source that sent each update by examining the contents of the update itself or by analyzing the address that the update was sent from. The sourcing engine 601 may further tag the update with a tag indicating the user with which the update is associated. The sourcing engine 601 may then transmit the update to the corresponding conversion engine for conversion.

Continuing with the first instance, the sourcing engine 601 may receive a first update from the first data source (e.g., the first social media website) for the first user, a second update from the second data source (e.g., the second social media web site) for the first user, a third update from the third data source (e.g., the third social media website) for the first user, and a fourth update from the fourth data source (e.g., the one or more internal databases) for the first user. The sourcing engine 601 may tag the first update with a first tag indicating the first data source, the second update with a second tag indicating the second data source, the third update with a third tag indicating the third data source, and the fourth update with a fourth tag indicating the third data source. At step 525, the sourcing engine 601 may convert the updates such that the data in the updates is in the common format. Each of the updates may include data that is in a different format (as each of the updates is from a different data source). Accordingly, a different conversion engine may be used to convert each update. Accordingly, based on the first tag, the sourcing engine 601 may transmit the first update to a first conversion engine 611 (discussed below in reference to FIG. 6). The sourcing engine 601 may include a flag in the transmittal indicating that the data in the transmittal is an update for the first user. Based on the second tag, the sourcing engine 601 may transmit the second update to a second conversion engine 612. The sourcing engine 601 may include a flag in the transmittal indicating that the data in the transmittal is an update for the first user. Based on the third tag, the sourcing engine 601 may transmit the third update to a third conversion engine 613. The sourcing engine 601 may include a flag in the transmittal indicating that the data in the transmittal is an update for the first user. Based on the fourth tag, the sourcing engine 601 may transmit the fourth update to a fourth conversion engine 614. The sourcing engine 601 may include a flag in the transmittal indicating that the data in the transmittal is an update for the first user. The first conversion engine 611, second conversion engine 612, third conversion engine 613, and fourth conversion engine 614 may then convert the first update, second update, third update, and fourth update, respectively, into a common format. At step 527, the converted updates may be saved in common data module repository 620. Processing may then return to step 523, where the sourcing engine 601 may receive additional updates from one or more data sources.

Figure 6:
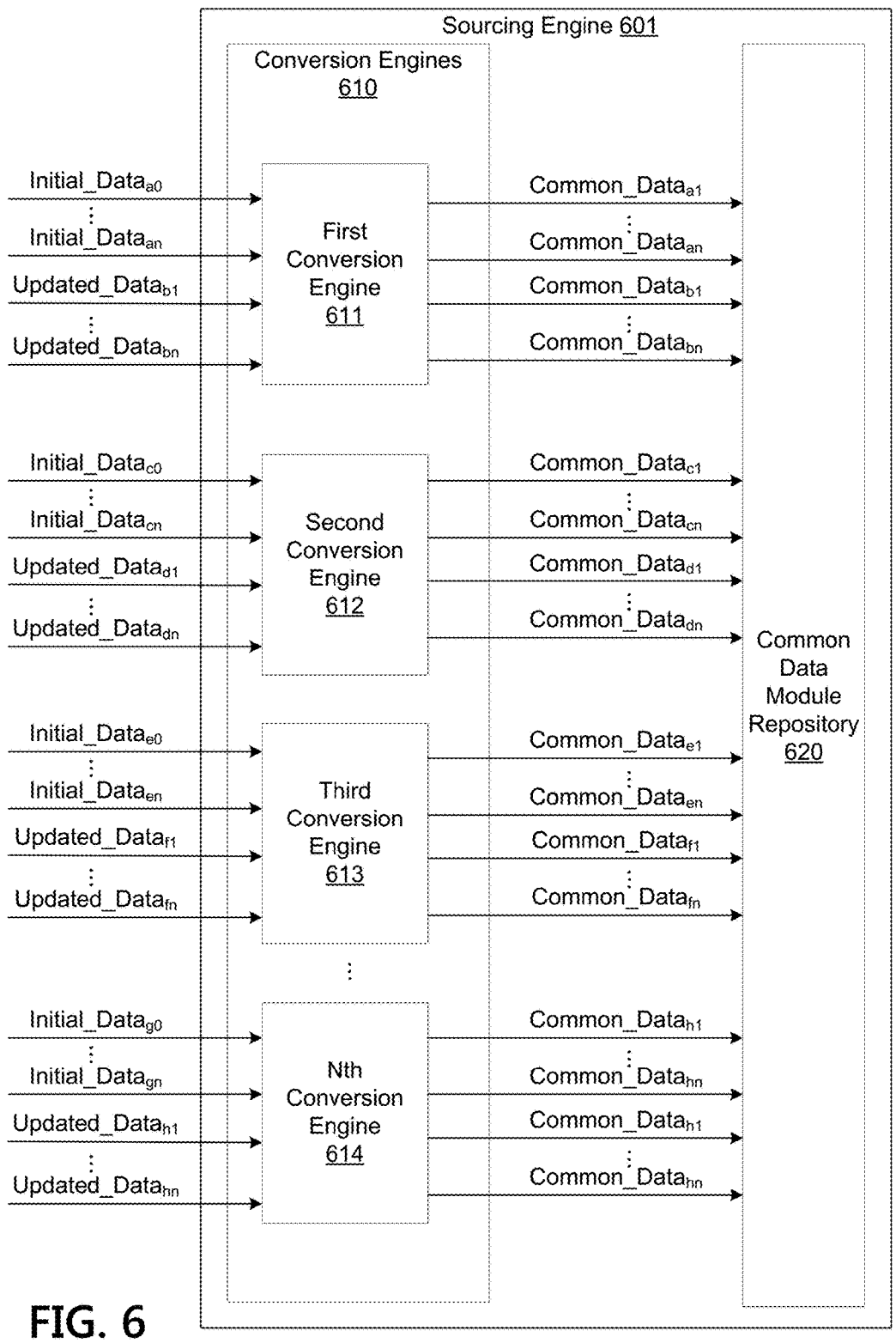
FIG. 6 shows an illustrative sourcing engine that may be utilized to convert sourced user-related data to a common format in accordance with one or more aspects described herein.

FIG. 6 depicts an illustrative the sourcing engine 601. The sourcing engine 601 may include one or processors or servers (not shown) that transmit requests for initial data and requests for updated data, and that receive the sets of initial data and the sets of updated data from one or more data sources. The sourcing engine 601 may further include one or more conversion engines. For example, as shown in FIG. 6, the sourcing engine 601 may include first conversion engine 611, second conversion engine 612, third conversion engine 613, and fourth conversion engine 614. The depiction of four conversion engines is for illustrative purposes, and a greater number or fewer number of conversion engines may be used. For example, the sourcing engine 601 may include one or more conversion engine for each data source from which the sourcing engine 601 receives user data.

Each of first conversion engine 611, second conversion engine 612, third conversion engine 613, and fourth conversion engine 614 may receive one or more (shown as Initial_Data$_{a0}$ . . . Initial_Data$_{an}$, Initial_Data$_{b0}$ . . . Initial_Data$_{bn}$, Initial_Data$_{c0}$ . . . Initial_Data$_{cn}$, and Initial_Data$_{a\ 0}$ . . . Initial_Data$_{an}$). Each set of initial data may be associated with a single user of the enterprise or may be associated with a batch of users of the enterprise. Each set of initial data may include a tag identifying the single user or the batch of users with whom that set of initial data is associated. The format of the set of initial data received by each conversion engine may differ, as the data source for the sets of initial data may differ. For example, as discussed above in reference to FIG. 5, a first set of initial data received from a first data source may be sent to first conversion engine 611, a second set of initial data received from a second data source may be sent to second conversion engine 612, a third set of initial data received from a third data source may be sent to third conversion engine 613, and a fourth set of initial data received from a fourth data source may be sent to fourth conversion engine 614. First data source, second data source, third data source, and fourth data source may each be different data sources, and the data received from each of these data sources may be in a different data format. The conversion engines may convert the sets of initial data received from each of these data sources into a common, predetermined format.

The sourcing engine 601 may further include common data module repository 620. Common data module repository 620 may store a plurality of common data modules (not shown). A common data module may be stored for each user of the enterprise. Each common data module may include a plurality of common data fields. The common data fields may be predetermined data fields. For example, the common data fields may include name, age, gender, account number(s) (e.g., a list of account numbers associated with one or more financial accounts maintained by the enterprise for the user), services (e.g., a list of services provided by the enterprise for the user), marital status, family members (e.g., a list of family members of the user), employment status, current employer, education information e.g., a list of colleges/universities that the user has graduated from, the date of graduation, and the like), residency location, contact information (phone number, email address, and the like), a set of user devices associated with the user and/or any other desired information. These common data fields may be populated with a value by one or more of first conversion engine 611, second conversion engine 612, third conversion engine 613, and fourth conversion engine 614 (discussed below). If multiple conversion engines have different values for a same common data field (for example, first conversion engine 611 has a first age for a first user and second conversion engine 612 has a second age for the first user), both values may be stored within the common data field. In addition to populating the common data fields with values, the conversion engines may populate the common data field with a timestamp indicating the time the value was received and a data source flag indicating the data source from which the value was received.

Accordingly, the common data module repository 620 may serve as a repository of all data for all users from all data sources. The data may be stored in a common format. The conversion engines may overwrite old data with new data as updates are received from data sources (discussed below). The conversion engines may further supplement old data with new data as updates are received from various data sources (discussed below).

First conversion engine 611 may convert one or more sets of initial data received from the first data source (shown as Initial_Data$_{a0}$ . . . Initial_Data$_{an}$) to produce one or more sets of data that are in compliance with a predetermined format (shown as Common_Data$_{a0}$ . . . Common Data$_{an}$). As discussed above in reference to FIG. 5, each set of initial data sent to first conversion engine 611 may include information identifying the user or set of users associated with that set of initial data. First conversion engine 611 may extract the identifying information from the inputted set of initial data. If the inputted data is associated with a batch of users (e.g., the input includes multiple sets of initial data each associated with a different user), first conversion engine 611 may convert each set of initial data in parallel or sequentially.

First conversion engine 611 may convert a first set of initial data Initial_Data$_{a0}$ associated with a first user by extracting one or more field names and corresponding field values from the first set of initial data. As discussed above in reference to FIG. 5, data from the first data source may be accessible via a first API that includes various nodes, edges, and fields. The sourcing engine 601 may sent an HTTP "Get" request to the first API that specifies the fields and/or edges that the sourcing engine 601 requests to read. The first set of initial data received from the first data source may include one or more field names and a field value that is associated with each of the one or more field names. Conversion engine 611 may extract each of the one or more field names and the field values associated with each of the one or more field names from the first set of initial data Initial_Data$_{a0}$. First conversion engine 611 may extract the data via cursor-based pagination or time-based pagination. First conversion engine 611 may then map the extracted field names and extracted field values to the common data fields to generate a set of common data Common_Data$_{a0}$. First conversion engine 611 may then populate the common data fields in the common data module associated with the first user with the corresponding field values by transmitting the set of common data Common_Data$_{a0}$ to common data module repository 620. First conversion engine 611 may repeat the conversion process for each set of initial data received from the sourcing engine 601. That is, for an n$^{th}$ set of initial data Initial_Data$_{an}$ received by first conversion engine 611 from the sourcing engine 601 for an n$^{th}$ user, first conversion engine 611 may generate an n$^{th}$ set of common data Common_Data$_{an}$ and populate the common data fields of the n$^{th}$ common data module maintained by the enterprise for the n$^{th}$ user within common data module repository 620.

As discussed above in reference to FIG. 5, first conversion engine 611 may additionally receive a set of updated data for a user. For example, first conversion engine 611 may receive a first set of updated data Updated_Data$_{b1}$ for a first user, wherein the first set of updated data is associated with a first data source. The first set of updated data may include one or more field names, as well as a field value for each field name. First conversion engine 611 may extract each field name and corresponding field value from the first set of updated data. First conversion engine 611 may then map each field name to a corresponding common data field. First conversion engine 611 may then generate a first set of common data Common_Data$_{b1}$ that includes the extracted field values that correspond to the common data fields. First conversion engine 611 may then transmit the first set of common data Common_Data$_{b1}$ to common data module repository 620, and populate the first common module associated with first user with the corresponding extracted field values.

First conversion engine 611 may populate the first common module differently based on the current contents of the first common module. For example, the first set of updated data Updated_Data$_{b1}$ for the first user received by first conversion engine 611 from the sourcing engine 601 (and the first data source) may include a field name and field value indicating that the current age of the first user is 30. First conversion engine 611 may analyze the corresponding common data field and value in the first common data module. If the corresponding common data field is non-populated (e.g., does not contain a value), first conversion engine 611 may populate the value of the corresponding common data field with the value in the set of common data Common_Data$_{b1}$. First conversion engine 611 may further include a timestamp and a flag indicating that the value is associated with the first data source. If the corresponding common data field is populated with a current value, first conversion engine 611 may determine the data source associated with the current value. If the data source associated with the current value is the first data source, first conversion engine 611 may overwrite the current value of the corresponding common data field with the field value in the common data set Common_Data$_{b1}$ (e.g., 30). First conversion engine 611 may further include a timestamp and a flag indicating that the value is associated with the first data source. If the data source associated with the current value is not the first data source, first conversion engine 611 may not modify the current value and further populate the corresponding common data field with the field value in the common data set Common_Data$_{b1}$ (e.g., 30). First conversion engine 611 may further include a timestamp and a flag indicating that the value is associated with the first data source. If the first set of updated data included multiple field names and field values, first conversion engine 611 may update the first common module as described above for each field name and field value. First conversion engine 611 may repeat the updating process for each set of updated data received from the sourcing engine 601. That is, for an n$^{th}$ set of updated data Updated_Data$_{bn}$ received by first conversion engine 611 from the sourcing engine 601 for an n$^{th}$ user, first conversion engine 611 may generate an n$^{th}$ set of common data Common_Data$_{bn}$ and populate the common data fields of the n$^{th}$ common data module maintained by the enterprise for the n$^{th}$ user within common data module repository 620.

Second conversion engine 612, third conversion engine 613, and fourth conversion engine 614 may similarly receive and convert sets of initial data. The extraction and mapping utilized by each conversion engine may differ as a result of the different formats of the received sets of initial data and updated data. Second conversion engine 612 may receive one or more sets of initial data Initial_Data$_{c1}$ . . . Initial_Data$_{cn}$. Second conversion engine 612 may extract field names and field values within each of these sets of initial to produce one or more sets of common data Common_Data$_{c1}$ . . . Common_Data$_{cn}$. Second conversion engine 612 may then populate the common data modules associated with the users for which the sets of initial data are received (and stored in common data module repository 620) with the values in the sets of common data Common_Data$_{c1}$ . . . Common_Data$_{cn}$ using the population method for sets of initial data described above in reference to first conversion engine 611. Second conversion engine 612 may include a time stamp for each populated value and an indication that the populated value is associated with the second data source. Second conversion engine 612 may further receive one or more sets of updated data Updated_Data$_{d1}$ . . . Updated_Data$_{dn}$. Second conversion engine 612 may extract field names and field values within each of these sets of updated data to produce one or more sets of common data Common_Data$_{d1}$ . . . Common_Data$_{dn}$. Second conversion engine 612 may then populate the common data modules associated with the users for which the sets of updated data are received (and stored in common data module repository 620) with the values in the sets of common data Common_Data$_{d1}$ . . . Common_Data$_{dn}$ using the population method for sets of updated data described above in reference to first conversion engine 611. Second conversion engine 612 may include a time stamp for each populated value and an indication that the populated value is associated with the second data source.

Third conversion engine 613 may receive one or more sets of initial data Initial_Data$_{e1}$ . . . Initial_Data$_{en}$. Third conversion engine 613 may extract field names and field values within each of these data sets to produce one or more sets of common data Common_Data$_{e1}$ . . . Common_Data$_{en}$. Third conversion engine 613 may then populate the common data modules associated with the users for which the sets of initial data are received (and stored in common data module repository 620) with the values in the sets of common data Common_Data$_{e1}$ . . . Common_Data$_{en}$ using the population method for sets of initial data described above in reference to first conversion engine 611. Third conversion engine 613 may include a time stamp for each populated value and an indication that the populated value is associated with the third data source. Third conversion engine 613 may further receive one or more sets of updated data Updated_Data$_{f1}$ . . . Updated_Data$_{fn}$. Third conversion engine 613 may extract field names and field values within each of these sets of updated data to produce one or more sets of common data Common_Data$_{f1}$ . . . Common_Data$_{fn}$. Third conversion engine 613 may then populate the common data modules associated with the users for which the sets of updated data are received (and stored in common data module repository 620) with the values in the sets of common data Common_Data$_{f1}$ . . . Common_Data$_{fn}$ using the population method for sets of updated data described above in reference to first conversion engine 611. Third conversion engine 613 may include a time stamp for each populated value and an indication that the populated value is associated with the third data source.

Fourth conversion engine 614 may receive one or more sets of initial data Initial_Data$_{g1}$ . . . Initial_Data$_{gn}$. Fourth conversion engine 614 may extract field names and field values within each of these data sets to produce one or more sets of common data Common_Data$_{g1}$ . . . Common_Data$_{gn}$. Fourth conversion engine 614 may then populate the common data modules associated with the users for which the sets of initial data are received (and stored in common data module repository 620) with the values in the sets of common data Common_Data$_{g1}$ . . . Common_Data$_{gn}$ using the population method for sets of initial data described above in reference to first conversion engine 611. Fourth conversion engine 614 may include a time stamp for each populated value and an indication that the populated value is associated with the fourth data source. Fourth conversion engine 614 may further receive one or more sets of updated data $Updated\_Data_{h1} \ldots Updated\_Data_{hn}$. Fourth conversion engine 614 may extract field names and field values within each of these sets of updated data to produce one or more sets of common data $Common\_Data_{h1} \ldots Common\_Data_{hn}$. Fourth conversion engine 614 may then populate the common data modules associated with the users for which the sets of updated data are received (and stored in common data module repository 620) with the values in the sets of common data $Common\_Data_{h1} \ldots Common\_Data_{hn}$ using the population method for sets of updated data described above in reference to first conversion engine 611. Fourth conversion engine 614 may include a time stamp for each populated value and an indication that the populated value is associated with the fourth data source.

Figure 7:
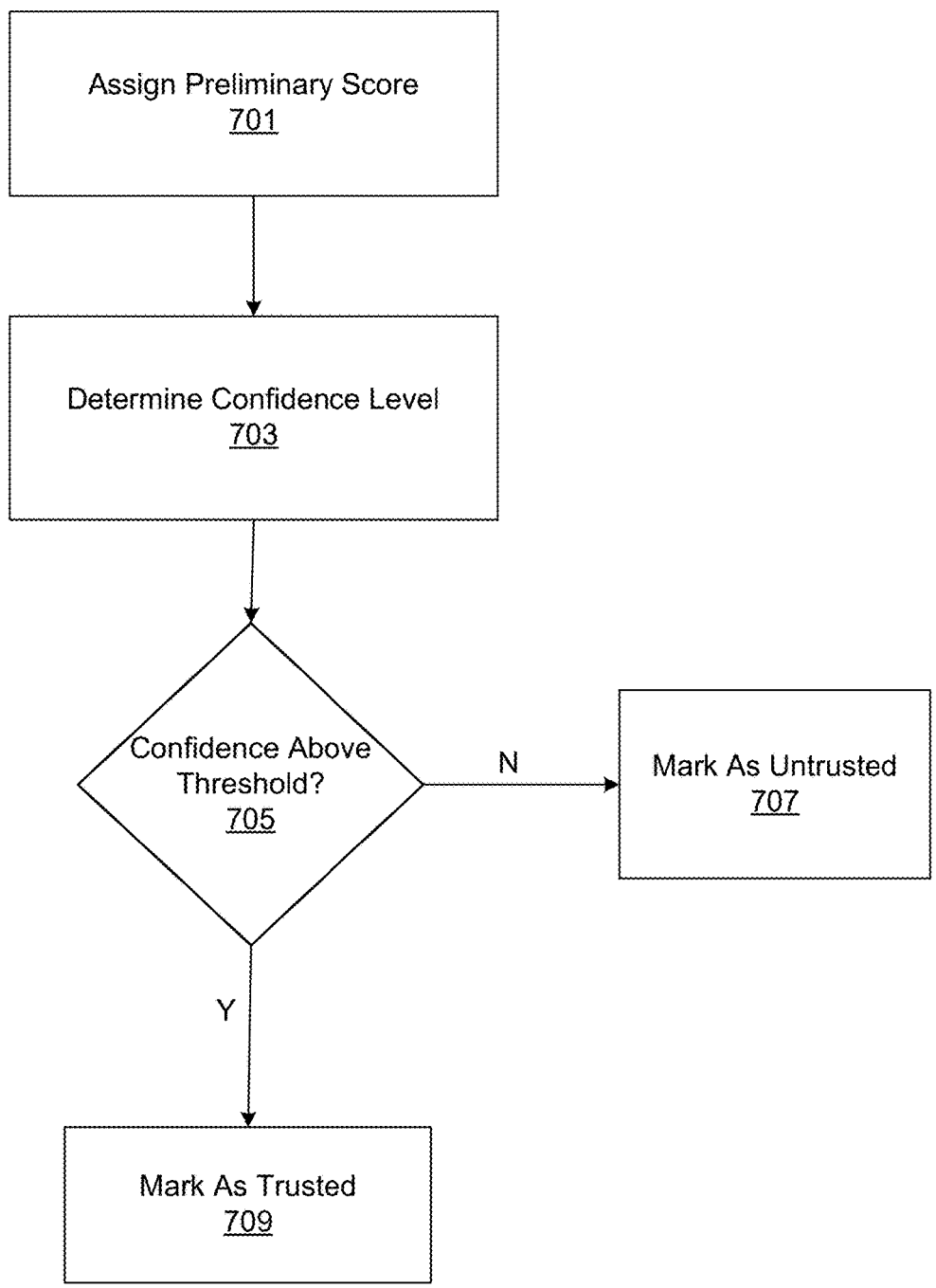
FIG. 7 shows an illustrative method for analyzing one or more common data fields in accordance with one or more aspects described herein.

FIG. 7 depicts an illustrative method for analyzing one or more common data fields. The method may be executed by the rules engine server 124 of automated service initiation engine 124. The rules engine server 124 may analyze one or more common data fields from one or more common modules in the common data module repository 620 utilizing the illustrated method. At step 701, rules engine server 124 may assign a preliminary score to a first common data field. The first common data field may be stored in a first common data module in common data module repository 620. The first common data module may be associated with a first user.

Rules engine server 124 may assign a preliminary score to the first common data field based on a first set of rules stored in rules engine server 124. The first set of rules may include one or more probabilistic models that may be dynamically modified within the rules engine server 124. The first set of rules may include relationships between common data fields and the data source(s) that provided the value(s) of the common data fields. That is, as discussed above in reference to FIG. 6, a common data field may include multiple values, wherein each value may be received from a different data source (such as the first data source, second data source, third data source, and fourth data source discussed above in reference to FIG. 5). The first set of rules may indicate the preliminary scores to be assigned to these values based on the data sources that provided these values.

For example, each common data module stored in common data module repository 620 may include at least a first common data field and a second common data field. In this example, the first common data field may be the marital status of the first user, and the second common data field may represent the employment status of the second user. The first common data field of the first common data module may store a first value that was received by the sourcing engine 601 from the first data source. The first common data field of the first common data module may further store a second value that was received by the sourcing engine 601 from the third data source. The second common data field of the first common data module may store a third value that was received by the sourcing engine 601 from the first data source. The second common data field of the first common data module may further store a fourth value that was received by the sourcing engine 601 from the third data source. The first set of rules may indicate that a value for the first common data field that is associated with the first data source is to be assigned a first score and that a value for the first common data field that is associated with the third data source is to be assigned a second score. The second score may be lower than the first score. That is, the enterprise may have determined that values for the first common data field are more reliable when sourced from the first data source than when sourced from the third data source, and the first set of rules may indicate this. The first set of rules may further indicate that a value for the second common data field that is associated with the first data source is to be assigned a third score and that a value for the second common data field that is associated with the third data source is to be assigned a fourth score. The fourth score may be higher than the third score. That is, the enterprise may have further determined that values for the second common data field are more reliable when sourced from the third data source than when sourced from the first data source, and the first set of rules may indicate this.

At step 703, the rules engine server 124 may determine a confidence level for the first common data field based on a second set of rules stored in the rules engine server 124. The rules engine server 124 may determine the confidence level by applying the second set of rules to the preliminary score calculated in step 701. The second set of rules may include one or more probabilistic models. For example, a first rule in the second set of rules may indicate that if the timestamp associated with a first value of the first common data field indicates that the first value was sourced prior to a predetermined date or prior to a predetermined amount of time, the preliminary score is to be decreased. The first rule in the second set of rules may further indicate that if the timestamp associated with the first value was not sourced prior to a predetermined date or prior to a predetermined amount of time, the preliminary score is to be increased. A second rule in the second set of rules may analyze the number of values that are currently populated for the common data field. That is, as noted above, a common data field may include multiple values, wherein each value may be received from a different data source. The second rule may adjust the preliminary score based on the number of values that are currently stored in the common data field. The second rule may include multiple thresholds levels. In one instance, the second rule may specify that if the common data field only includes a single value, the preliminary score is to be increased by a first amount. The second rule may further specify that if the number of values stored for a common data field is between a first threshold and a second threshold, the preliminary score is to be decreased by a second amount. If the number of values stored for a common data field is between a third threshold and fourth threshold, the second rule may indicate that the preliminary score is to be decreased by a third amount, and so forth.

For example, each common data module stored in common data module repository 620 may include at least a first common data field and a second common data field. The first common data field of the first common data module may store a first value that was received by the sourcing engine 601 from the first data source. The first common data field may further store a second value that was received by the sourcing engine 601 from the second data source. The second common data field may store only a third value that was received by the sourcing engine 601 from the first data source. In this example, the rules engine server 124 may increase the preliminary score calculated for the first common data field at step 701, as the first common data field only stores a single value. The rules engine server 124 may further decrease the preliminary score calculated for the second common data field at step 401, as the second common data field stores multiple values.

The first rule of the second set of rules and the second rule of the second set of rules are for illustrative purposes, and a greater number of rules or fewer number of rules may be included in the second set of rules. The rules engine server 124 may adjust the preliminary score calculated in step 701 using a plurality of rules from the second set of rules. For example, the rules engine server 124 may increase the preliminary score calculated in step 701 after applying a first rule, and may then decrease the adjusted preliminary score after applying a second rule. Once the rules engine server 124 has applied all applicable rules from the second set of rules, the final calculated score may represent the confidence level of the first common data field.

At step 705, the rules engine server 124 may determine if the confidence level calculated in step 703 is above a threshold. The threshold used in step 705 may be predetermined and may be dynamically modified within the rules engine server 124. If, at step 705, the rules engine server 124 determines that the confidence level is not above the threshold, the rules engine server 124 may, at step 707, set a flag within the first common data module indicating that the first common data field is not a trusted data field. If, at step 705, the rules engine server 124 determines that the confidence level is above the threshold, the rules engine server 124 may, at step 709, set a flag within the first common data module indicating that the first common data field is a trusted data field. Trusted data fields may then be utilized by one or more components within the entity computing system 110 to drive further user-based decision making.

Figure 8:
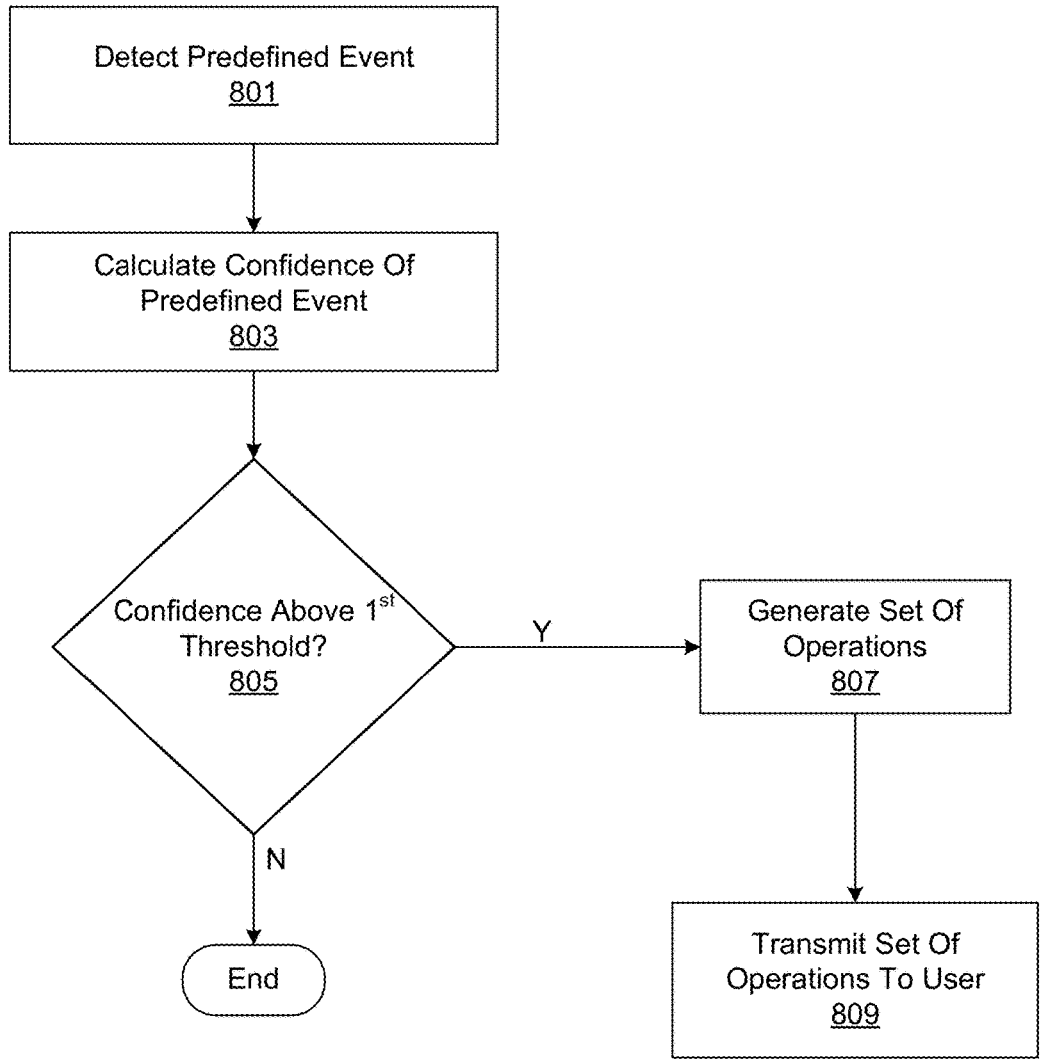
FIG. 8 shows an illustrative method for detecting a predefined event utilizing one or more common data fields in accordance with one or more aspects described herein.

FIG. 8 shows an illustrative method for detecting a predefined event utilizing one or more common data fields. The illustrative method may be executed by the services triggering engine 128 of the entity computing system 110. The services triggering engine 148 may monitor the flags set by the rules engine server 124 within the common data modules stored in common data module repository 620 in order to detect predefined events. That is, the services triggering engine 148 may monitor common data fields that have been marked as "trusted" by the rules engine server 124 to determine if the values of one or more trusted common data fields is indicative of a predefined event. A predefined event may be defined as any change in value of a common data field and/or a change in value of a common data field to a predefined value. Alternatively, or additionally, a predefined event may be defined as any changes in values of a combination of common data fields and/or changes in values of a combination of common data fields to predefined values. At step 801, the services triggering engine 128 may detect a predefined event that is based on a change in value of one or more common data fields. The one or more common data fields may be stored in a first common data module in common data module repository 620. The first common data module may be associated with a first user.

In a first example, the sourcing engine 601 may receive first updated data for a first user from a first data source. The sourcing engine 601 may send the updated data to the first conversion engine 611. The conversion engine 611 may extract the field name and field value from the first updated data and map the extracted field name to a first common data field. First conversion engine 611 may further generate a first set of common data and transmit the first common set of data to common data module repository 620 in order to populate the first common data field with the extracted field value. The rules engine server 124 may then analyze the first common data field and determine that the first common data field is a trusted data field. The services triggering engine 148 may then analyze the first common data field to determine whether the updated value stored in the first common data field represents a predefined event.

In a second example, the sourcing engine 601 may receive first updated data for a first user from a first data source. The sourcing engine 601 may further receive second updated data for the first user from a second data source. The sourcing engine 601 may send the first updated data to the first conversion engine 611. The sourcing engine 601 may further send the second updated data to the second conversion engine 612. First conversion engine 611 may extract the field name and field value from the first updated data and map the extracted field name to a first common data field. First conversion engine 611 may further generate a first set of common data and transmit the first set of common data to common data module repository 620 in order to populate the first common data field with the extracted field value. Second conversion engine 612 may extract the field name and field value from the second updated data and map the extracted field name to a second common data field. Second conversion engine 612 may further generate a second set of common data and transmit the second set of common data to common data module repository 620 in order to populate the second common data field with the extracted field value. The rules engine server 124 may analyze the first common data field and determine that the first common data field is a trusted data field. The rules engine server 124 may further analyze the second common data field and determine that the second common data field is a trusted data field. The services triggering engine 148 may then analyze the first common data field and the second common data field to determine whether the updated value stored in the first common data field and the second common data field represents a predefined event. For example, the rules of the rules engine server 124 may provide that an upcoming marriage is likely where the collected data includes: (1) information retrieved from an internal bank server relating to a large transaction at a jewelry store; and/or (2) a relationship status of "In a Relationship" retrieved from one or more social media data sources. In another example, the rules may provide that recent home purchase is likely where the collected data includes: (1) information retrieved from an internal bank server relating to an approved mortgage loan application; and/or (2) an event retrieved from the first data source, where the event body includes the words "house warming."

At step 803, the services triggering engine 148 may analyze the detected predefined event to calculate a confidence level of the predefined event. The services triggering engine 148 may analyze the detected predefined event using one or more rules. The one or more rules may be probabilistic models. The one or more rules may be dynamically modified within the services triggering engine 148. As noted above, a predefined event may be defined as any change in value(s) of one or more common data fields, and/or the setting of one or more values of one or more common data fields to one or more predefined values. Therefore, different rules may be used to analyze the detected predefined event based on the subject common data field(s). For example, a first predefined event may be defined as any change made to a first common data field. Accordingly, the services triggering engine 148 may use a first rule (or first set of rules) to determine a confidence level of a detected first predefined event. A second predefined event may be defined as determining that the value of the first common data field is set to a predefined value. The services triggering engine 148 may use a second rule (or second set of rules) to determine the confidence level of a detected second predefined event. A third predefined event may be defined as any change in value made to both a first common data field and a second common data field. Services triggering engine 148 may use a third rule (or third set of rules) may be used to determine the confidence level of a detected third predefined event. A fourth predefined event may be defined as determining that a first value of a first common data field is set to a first predefined value and that a second value of a second common data field is set to a second predefined value. The services triggering engine 148 may use a fourth rule (or fourth set of rules) to determine the confidence level of a detected fourth predefined event.

At step 805, the services triggering engine 148 may determine if the confidence level of the detected predefined event is above a threshold. The threshold may be predetermined and may be dynamically modified within the services triggering engine 148. If, at step 805, the services triggering engine 148 determines that the confidence level of the detected predefined event is not above the threshold, processing may end. If, at step 805, the services triggering engine 148 determines that the confidence level of the detected predefined event is above the threshold, the services triggering engine 148 may, at step 807, generate a set of operations.

The set of operations generated by the services triggering engine 148 may depend on the specific predefined event that is detected by the services triggering engine 148 at step 801. The services triggering engine 148 may maintain a master list of operations and a master list of predefined events. Each operation in the master list of operations may be associated with one or more predefined events from the master list of predefined events. In turn, each predefined event in the master list of predefined events may be associated with one or more operations from the master list of operations. The associations between the operations and the predefined events may be predetermined and may be dynamically modified within the services triggering engine 148. Each operation in the master list of operations may further be associated with a preferred timeframe during which that operation should be completed.

The services triggering engine 148 may determine, from the master list of predefined events, a set of operations associated with the predefined event detected at step 801. Each operation in the set of operations may be an operation that is to be completed by the first user. For example, the predefined event detected at step 801 may be a change in employment information for the first user (e.g., the first user has an updated employer). In this example, a potential operation may be the completion of a new direct deposit form. Another potential operation may require the first user to sign onto an online portal provided by the enterprise and update the first user's employment information within the online portal. In another example, the predefined event detected at step 801 may be a change in the first user's marital status (e.g., the first user may have recently divorced). A potential operation may require the first user to login to the online portal provided by the enterprise and update the first user's marital information. Additionally, or alternatively, a potential operation may require the first user to provide updated account information to the enterprise (e.g., modify a financial account maintained by the enterprise for the first user from a joint account to a single-holder account). The services triggering engine 148 may compile the set of operations into a master checklist. The master checklist may include each operation and the preferred timeframe for completion of each operation. The master checklist may further include additional information that may be needed to complete operations in the master checklist. For example, if a first operation requires the first user to login to an online portal maintained by the enterprise, the master checklist may include an embedded Internet link to the online portal. If the first user clicks on the Internet link via a computing device, the first user may be taken to the online portal on the computing device.

At step 809, the set of operations may be sent to the first user in the form of the master checklist. The services triggering engine 148 may determine contact information for the first user by accessing the information from the first common data module in the common data module repository 620. For example, the services triggering engine 148 may determine the home address of the first user, a mobile device associated with the first user, and an email address associated with the first user. The services triggering engine 148 may then send the master checklist via one or more of these channels. If the contact information for the first user includes multiple mobile devices and/or email addresses, the master checklist may be sent to each mobile device and/or email address. For example, the services triggering engine 148 may send a link to the master checklist to the mobile device associated with the first user via a text message. If the first user selects the link in the text message, the first user may be directed, via the mobile device, to on an Internet website displaying the master checklist. The user may then view the master checklist on the mobile device and select any embedded links within the displayed master checklist. Alternatively, or additionally, the services triggering engine 148 may send an email to an email address associated with the first user. The first user may view the email on a first computing device. The email may include the master checklist within the body of the email. The first user may select any embedded links directly within the email, and be directed to the online portal maintained by the enterprise. Alternatively, the email may include an Internet link to the master checklist. The first user may select the Internet link and be directed to an Internet website (or online portal) displaying the master checklist. The first user may then select embedded Internet links within the displayed master checklist. The first user may complete the operations of the master checklist via the computing device the first user utilizes to access the master checklist or via a one or more additional computing devices. Once the first user completes an operation listed in the master checklist via a computing device, a notification may be transmitted from the computing device to the services triggering engine 148 via one or more organization computing devices and/or networks. The services triggering engine 148 may then generate an updated master checklist. The updated master checklist may only include the operations that still need to be completed by the first user, or may mark completed operations as "complete." The services triggering engine 148 may then transmit the updated master checklist to the first user via one or more email address associated with the first user or via one or more mobile devices associated with the first user.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system, comprising:
   at least one processor;
   a communication interface comprising an Internet connection; and
   a non-transitory memory device storing computer-readable instructions that, when executed by the at least one processor, cause the system to:
      retrieve, from a data repository by a sourcing engine server, user information corresponding to a user of products and services of a business entity;
      identify, by the sourcing engine server, at least one a social network identification of the user;
      match, by a match engine server, the user to a plurality of individuals based on the user information;
      monitor, by the sourcing engine server, a plurality of social network communications associated with the social network identification of the user;
      analyze, by the sourcing engine server, the plurality of social network communications associated with the social network identification of the user using rules provided by a rules engine server, wherein the sourcing engine server analyzes a plurality of social media posts of the user;
      generate, by the sourcing engine server and based on analyzed social network communications, a life event trigger condition identified by the sourcing engine server from analyzed social media posts based on predetermined criteria stored in a database;
      in response to the life event trigger condition, receive, via a secure network, input from matched individuals within a trusted network of the user that corresponds to the life event trigger condition, wherein the input is received in response to the life event trigger condition without being solicited by the user; and
      provide, via the secure network, a user interface screen presenting aggregated inputs from at least one of the plurality of individuals, the inputs corresponding to a same identified life event trigger condition; and
   a ratings sever communicatively coupled to the sourcing engine server, wherein the ratings server comprises a processor and a non-transitory memory device storing instructions that, when executed by the processor, cause the ratings server to:
      communicate a user interface screen to a user via a secure network connection; and
      receive, from one or more users via the user interface screen, information corresponding to a rating of the input received from matched individuals corresponding to the trigger condition.

2. The system of claim 1, further comprising
   the sourcing engine server; and
   a rules engine server, wherein the sourcing engine server identifies one or more matches between the user and the plurality of individuals based on one or more rules generated by the rules engine.

3. The system of claim 1, wherein the life event trigger condition comprises a life event trigger corresponding to a life event indicated in content associated with the plurality of social network communications.

4. The system of claim 3, wherein the life event comprises at least one of a relationship life event, a parental life event, an employment life event, and a financial life event.

5. The system of claim 1, further comprising:
   the secure network, wherein the secure network comprises a secure communication link between one or more user devices and a business entity computing system.

6. The system of claim 5, wherein the one or more user devices comprise at least one of a portable computing device, a smart phone, a laptop computer and a tablet computing device.

7. The system of claim 5, wherein the one or more user devices comprises a desktop computing device.

8. The system of claim 5, further comprising a communications software application installed on a mobile user computing device, wherein the communications software application facilitate secure communications via the secure network.

9. The system of claim 1, wherein the information corresponding to the rating of the input received from matched individuals includes a self-generated rating.

10. A method comprising:
    retrieving, from a data repository by a sourcing engine server, user information corresponding to a user of products and services of a business entity;
    identifying, by the sourcing engine server, at least one a social network identification of the user;
    matching, by a match engine server, the user to a plurality of individuals based on the user information;
    monitoring, in real-time by the sourcing engine server, a plurality of social network communications associated with the social network identification of the user;
    analyzing, by the sourcing engine server, the plurality of social network communications associated with the social network identification of the user using rules provided by a rules engine server;
    generating, by the sourcing engine server, based on analyzed social network communications, a life event trigger condition based on predetermined criteria stored in a database;
    in response to the life event trigger condition, automatically receiving, via a secure network, input from matched individuals corresponding to the life event trigger condition; and
    provide, via the secure network, a user interface screen presenting aggregated inputs from at least one of the plurality of individuals, the inputs corresponding to a same identified life event trigger condition;
    communicating, by a ratings server, a user interface screen to a user via the secure network; and
    receiving, from one or more users via the user interface screen, information corresponding to a rating of the input received from matched individuals corresponding to the trigger condition.

11. The method of claim 10, further comprising
    identifying, by the sourcing engine, one or more matches between the user and the plurality of individuals based on one or more rules generated by a rules engine server.

12. The method of claim 10, wherein the life event trigger condition comprises a life event trigger corresponding to a life event indicated in content associated with the plurality of social network communications.

13. The method of claim 12, wherein the life event comprises at least one of a relationship life event, a parental life event, an employment life event, and a financial life event.

14. The method of claim 10, wherein the secure network comprises a secure communication link between one or more user devices and a business entity computing system.

15. The method of claim 14, wherein the one or more user devices comprise at least one of a portable computing device, a smart phone, a laptop computer and a tablet computing device.

16. The method of claim 14, wherein the one or more user devices comprises a desktop computing device.

17. The method of claim 14, further comprising a communications software application installed on a mobile user computing device, wherein the communications software application facilitate secure communications via the secure network.

18. An apparatus comprising:
   at least one processor;
   a communication interface comprising an Internet connection; and
   a non-transitory memory device storing computer-readable instructions that, when executed by the at least one processor, cause the apparatus to:
      retrieve, from a data repository, user information corresponding to a user of products and services of a business entity;
      identify, at least one a social network identification of the user;
      match, the user to a plurality of individuals based on the user information;
      monitor, a plurality of social network communications associated with the social network identification of the user;
      analyze, in real-time, the plurality of social network communications associated with the social network identification of the user using rules provided by a rules engine server;
      generate, based on analyzed social network communications, a life event trigger condition based on predetermined criteria stored in a database;
      in response to the trigger condition, receive automatically, via a secure network, input from matched individuals corresponding to the life event trigger condition;
      provide, via the secure network, a user interface screen presenting aggregated inputs from at least one of the plurality of individuals, the inputs corresponding to a same identified life event trigger condition;
      communicate, by a ratings server, a user interface screen to a user via the secure network; and
      receive, from one or more users via the user interface screen, information corresponding to a rating of the input received from matched individuals corresponding to the trigger condition.

19. The apparatus of claim 18, wherein the non-transitory memory device stores further instructions that, when executed by the processor, cause the apparatus to generate permissions associated with each of the plurality of individuals.

\* \* \* \* \*